(12) United States Patent
Lanka et al.

(10) Patent No.: US 12,711,499 B2
(45) Date of Patent: Aug. 18, 2026

(54) MULTI-AGENT COMPUTER SOFTWARE FRAMEWORK FOR A CONVERSATIONAL ARTIFICIAL INTELLIGENCE SYSTEM

(71) Applicant: PayPal, Inc., San Jose, CA (US)

(72) Inventors: Soujanya Lanka, Singapore (SG); Guangsen Wang, Singapore (SG); Reyha Verma, Bangalore Urban (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/759,399

(22) Filed: Jun. 28, 2024

(65) Prior Publication Data

US 2025/0063003 A1 Feb. 20, 2025

(30) Foreign Application Priority Data

Aug. 14, 2023 (IN) ............................ 202341054463
Nov. 8, 2023 (IN) ............................ 202341076442

(51) Int. Cl.
*G06F 40/30* (2020.01)
*G06Q 10/0639* (2023.01)
(Continued)

(52) U.S. Cl.
CPC .......... *G06Q 20/386* (2020.05); *G06F 40/30* (2020.01); *G06Q 10/06393* (2013.01); *G06Q 10/06395* (2013.01); *H04L 51/02* (2013.01)

(58) Field of Classification Search
CPC .......... G06Q 20/386; G06Q 10/06393; G06Q 10/06395; G06Q 30/015; G06F 40/30; G06F 40/35; H04L 51/02
See application file for complete search history.

(56) References Cited

U.S. PATENT DOCUMENTS 11,012,381 B2 5/2021 Chavda
11,431,660 B1 8/2022 Leeds et al.
(Continued)

FOREIGN PATENT DOCUMENTS

WO 2011089450 A2 7/2011
WO 2015089336 A2 6/2015
(Continued)

OTHER PUBLICATIONS

Bunt H., et al., "Semantic and Pragmatic Precision in Conversational AI Systems," Frontiers in Artificial Intelligence, Mar. 30, 2023, vol. 6, No. 896729, 16 pages.

(Continued)

*Primary Examiner* — Soe Hlaing
(74) *Attorney, Agent, or Firm* — Haynes and Boone, LLP

(57) ABSTRACT

Methods and systems are presented for providing an artificial intelligence (AI)-based conversation system for facilitating a conversation with users and processing transactions for the users. The AI-based conversation system includes an AI model coupled with different backend modules. Based on an utterance submitted by a user during a chat session, the AI model is configured to generate instructions for a backend module to perform a transaction for the user based on a prompt template. The AI model also communicates the instructions to the backend module using a protocol specified in the prompt template. Upon receiving an output from the backend module, the AI model is configured to generate content for the chat session based on the output, and provide the content to the user.

20 Claims, 11 Drawing Sheets

(51) Int. Cl.
*G06Q 20/38* (2012.01)
*H04L 51/02* (2022.01)

(56) References Cited

U.S. PATENT DOCUMENTS

| | | | |
|---|---|---|---|
| 11,544,475 | B2 | 1/2023 | Mittal et al. |
| 11,606,463 | B1 | 3/2023 | Yeracaris |
| 11,714,855 | B2 | 8/2023 | Mahindru et al. |
| 11,743,378 | B1 | 8/2023 | Johnston et al. |
| 11,875,240 | B1 | 1/2024 | Bosnjakovic et al. |
| 11,936,814 | B1 | 3/2024 | Mehta et al. |
| 11,960,514 | B1 | 4/2024 | Taylert et al. |
| 2014/0278352 | A1 | 9/2014 | Clark et al. |
| 2014/0279050 | A1 | 9/2014 | Makar et al. |
| 2016/0070693 | A1 | 3/2016 | Carrier et al. |
| 2016/0371703 | A1 | 12/2016 | Monegan et al. |
| 2017/0324867 | A1 | 11/2017 | Tamblyn et al. |
| 2018/0052826 | A1* | 2/2018 | Chowdhary ............ G06F 40/58 |
| 2019/0155750 | A1 | 5/2019 | Wang et al. |
| 2019/0206406 | A1 | 7/2019 | Sugiyama et al. |
| 2019/0286712 | A1 | 9/2019 | Terry et al. |
| 2019/0311036 | A1 | 10/2019 | Shanmugam et al. |
| 2020/0099633 | A1* | 3/2020 | D'Agostino .......... G06F 3/0481 |
| 2020/0117709 | A1 | 4/2020 | Galitsky |
| 2020/0126540 | A1 | 4/2020 | Panchamgam |
| 2020/0137002 | A1 | 4/2020 | Chavda |
| 2020/0143115 | A1 | 5/2020 | Brigham et al. |
| 2020/0143247 | A1 | 5/2020 | Jonnalagadda et al. |
| 2020/0143265 | A1 | 5/2020 | Jonnalagadda et al. |
| 2020/0201913 | A1 | 6/2020 | Terry et al. |
| 2020/0259891 | A1 | 8/2020 | Abraham |
| 2020/0342874 | A1* | 10/2020 | Teserra ................. G06F 40/263 |
| 2020/0374394 | A1 | 11/2020 | Karp et al. |
| 2021/0144107 | A1* | 5/2021 | Liang ....................... G06N 5/04 |
| 2021/0201144 | A1 | 7/2021 | Jonnalagadda |
| 2021/0374167 | A1 | 12/2021 | Williams et al. |
| 2021/0397796 | A1* | 12/2021 | Dounis ................. G06F 40/279 |
| 2022/0012600 | A1 | 1/2022 | Trim et al. |
| 2022/0058347 | A1 | 2/2022 | Singaraju |
| 2022/0107792 | A1 | 4/2022 | Gottschlich |
| 2022/0245199 | A1 | 8/2022 | Mahindru et al. |
| 2023/0035306 | A1 | 2/2023 | Liu et al. |
| 2023/0121355 | A1 | 4/2023 | Srinivasan et al. |
| 2023/0135179 | A1 | 5/2023 | Mielke |
| 2023/0245651 | A1 | 8/2023 | Wang |
| 2023/0259960 | A1 | 8/2023 | Harris |
| 2023/0274095 | A1 | 8/2023 | Kelkar et al. |
| 2023/0342557 | A1 | 10/2023 | Hasan |
| 2023/0351257 | A1 | 11/2023 | Mourya |
| 2024/0028963 | A1 | 1/2024 | Blinov et al. |
| 2024/0038226 | A1 | 2/2024 | Nouri et al. |
| 2024/0062021 | A1* | 2/2024 | Tangari ................. G06F 40/253 |
| 2024/0095460 | A1 | 3/2024 | Xu et al. |
| 2024/0144049 | A1 | 5/2024 | Cheng et al. |
| 2024/0184991 | A1 | 6/2024 | Mahabaleshwarkar et al. |
| 2024/0256582 | A1 | 8/2024 | Jain et al. |
| 2024/0330290 | A1 | 10/2024 | Shrestha et al. |
| 2024/0370476 | A1 | 11/2024 | Madisetti et al. |
| 2024/0419710 | A1 | 12/2024 | Matson |
| 2025/0147887 | A1 | 5/2025 | Srinivasan et al. |

FOREIGN PATENT DOCUMENTS

| | | | |
|---|---|---|---|
| WO | 2021108679 | A1 | 6/2021 |
| WO | 2022043675 | A2 | 3/2022 |

OTHER PUBLICATIONS

Radziwill N., et al., "Evaluating Quality of Chatbots and Intelligent Conversational Agents," arXiv preprint arXiv: 1704.04579, 2017, 21 pages.

International Search Report and Written Opinion for Application No. PCT/US2024/40299, mailed on Oct. 18, 2024, 14 pages.

International Search Report and Written Opinion for Application No. PCT/US2024/040226, mailed on Aug. 30, 2024, 9 pages.

Cohen, "Right on Track: NVIDIA Open-Source Software Helps Developers Add Guardrails to AI Chatbots". [Retrieved from the Internet]. [Retrieved from https://blogs.nvidia.com/blog/2023/04/25/ai-chatbot-guardrails-nemo/ on Jan. 22, 2025.].

International Search Report and Written Opinion for Application No. PCT/US2025/049084 mailed on Dec. 5, 2025, 20 pages.

Guu, Kelvin et al. "REALM: Retrieval-Augmented Language Model Pre-Training," Feb. 10, 2020, 12 pages, Retrieved from the Internet: URL: https://arxiv.org/pdf/2002.08909.pdf? [retrieved on Feb. 14, 2024].

Jiang, Zhengbao et al. "Active Retrieval Augmented Generation," May 11, 2023, 24 pages, Retrieved from the Internet: URL: https://arxiv.org/pdf/2305.06983v1 [retrieved on Jun. 23, 2026].

Lewis, Patrick et al. "Retrieval-Augmented Generation for Knowledge-Intensive NLP Tasks," Cornell University Library, Dec. 7, 2020, 19 pages, Ithaca, New York.

* cited by examiner

MULTI-AGENT COMPUTER SOFTWARE FRAMEWORK FOR A CONVERSATIONAL ARTIFICIAL INTELLIGENCE SYSTEM

CROSS-REFERENCE TO RELATED APPLICATIONS

This application claims priority under 35 U.S.C. § 119 to Indian Provisional Patent Application No. 202341054463, filed on Aug. 14, 2023, and to Indian Provisional Patent Application No. 202341076442, filed on Nov. 8, 2023, which are incorporated by reference herein in their entirety.

BACKGROUND

The present specification generally relates to computer-based automated interactive services, and more specifically, to a framework for providing a conversational artificial intelligence system configurable to interact with users and to perform various transactions for the users according to various embodiments of the disclosure.

RELATED ART

Service providers typically provide a platform for interacting with their users. The platform can be implemented as a website, a mobile application, or a phone service, through which the users may access data and/or services offered by the service provider. While these platforms can be interactive in nature (e.g., the content of the platform can be changed based on different user interactions, etc.), they are fixed and bound by their structures. In other words, users have to navigate through the platform to obtain the desired data and/or services. When the data and/or the service desired by a user is "hidden" (e.g., requiring multiple navigation steps that are not intuitive, etc.), it may be difficult for the user to access the data and/or the service purely based on manual navigation of the platform.

In the past, service providers have often dedicated one or more information pages, such as a "Frequently Asked Questions (FAQ)" page, within the platforms for assisting users to access data and/or services that are popular in demand. The information pages may include predefined questions, such as "how to change my password" and pre-populated answers to the questions. However, given that the questions were pre-generated, a user who is looking for data and/or services is still required to navigate through the information pages to find a question that matches the data and/or services that the user desires. If the desired data and/or services do not match any of the questions on the information pages, the user will have to manually navigate the platform or contact a human agent of the service provider. Furthermore, the information pages also create an additional burden for the service provider, as the answers to the pre-generated questions would need to be reviewed and/or modified as necessary whenever any one of the platform, the data, and/or the services offered by the service provider is updated. Thus, there is a need for an advanced framework for providing data and/or services to users in a natural and intuitive way.

Figure 1:
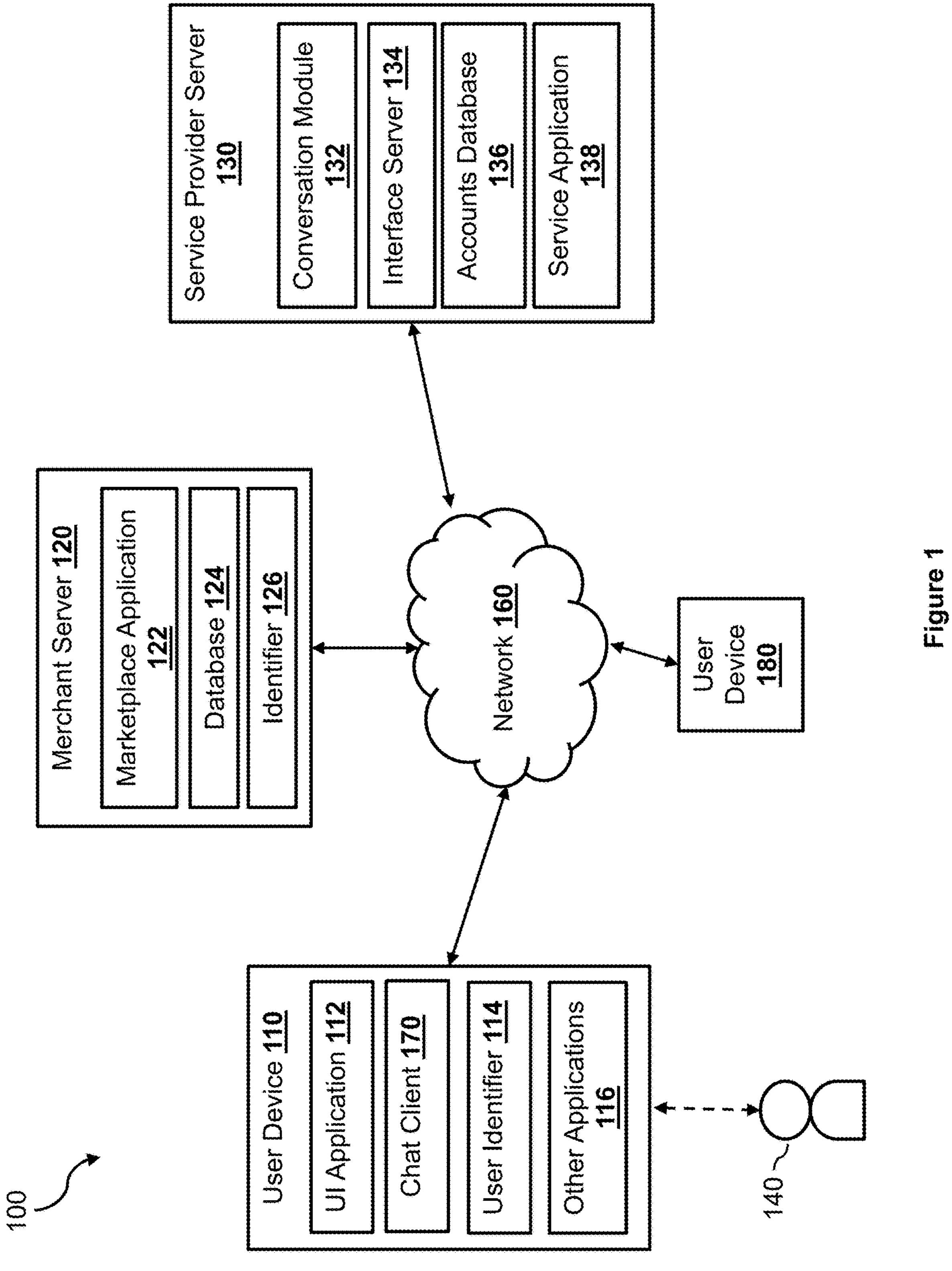
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a computer framework that uses one or more artificial intelligence (AI) models to interact with, and provide services to, users. As used herein, an AI model is a computer-based model that can be configured and trained to provide natural conversation services for users (e.g., automatically interpreting input utterances submitted by the users, and to generate output utterances to the users in a natural language format, such as free-form/unstructured texts, to facilitate natural dialogues with the users, etc.). Example AI models may include machine learning models, deep learning neural networks, large language models, small language models, etc.

Conventional dialogue systems (also known as "chat robots" or "chat bots") that are not AI-based are typically inflexible, as they are configured to provide mostly pre-generated answers. On the other hand, an AI-based conversation system is flexible and can be configured to provide natural and unstructured dialogues with users (e.g., by providing utterances to users that are dynamically generated in real-time, such as generated within several seconds from receiving an utterance from the users, etc.). An utterance may include one or more sentences and/or phrases in a natural language format. For example, in some embodiments, the AI-based conversation system can be trained using training data including web content, videos, audio, white papers, articles, books, or other materials that are related to an organization, such that the AI-based conversation system may dynamically generate answers to a user query by providing relevant information associated with the organization to the users via natural dialogues. In addition, the AI-based conversation system may also be trained using training data that includes programming code and application programming interface (API) calls with various parameters and input values, such that the AI-based conversation system may dynamically communicate with, and provide instructions (e.g., API calls, etc.) to, different backend computer programs (e.g., transaction processing modules, etc.) to perform various types of transactions for the users.

As such, according to various embodiments of the disclosure, the computer framework may provide one or more AI models to the AI-based conversation system, where the one or more AI models may be communicatively coupled with a chat interface and various backend modules, for providing conversation and transaction services to users. The chat interface may be part of a chat system that facilitates chat-based communications between users of the organization and the AI-based conversation system. For example, the chat system may include chat clients that can be installed and executed on various user devices of the users of the organization. Each chat client may also provide a chat interface for a user on a user device. Through the chat interface provided by the chat client, a user may initiate a chat session with the AI-based conversation system and may conduct a conversation with the AI-based conversation system (e.g., one or more dialogues between the user and the AI-based conversation system). For example, a user may, via a chat client and during a chat session with the AI-based conversation system, ask for information related to different topics associated with the organization, such as information about a transaction conducted via the organization, information about a user account, information on how to perform a transaction via a platform (e.g., a website) provided by the organization, etc.

In some embodiments, the AI model may be configured to provide the requested information to the user via the chat interface. For example, the AI model may be trained using training data that includes various information related to the organization, such that the AI model may generate answers to the users' queries about the organization. However, as the information related to the organization can be constantly changed/updated, it is inefficient to constantly re-train the AI model frequently as training (or re-training) the AI model typically requires a large amount of computer resources and time. As such, in some embodiments, the computer framework may provide a knowledge module (which can be implemented as a computer module, etc.) that is communicatively coupled with the AI model for providing relevant information to the AI model based on user queries. For example, the knowledge module may have access to the information related to the organization (e.g., stored in one or more data storages). In some embodiments, the knowledge module may be configured to query, from the data storages, a subset of information that is relevant to a user query.

As such, upon receiving an inquiry, such as a question or a request, from the user via the chat interface, the AI model may interpret the inquiry and transform the inquiry into a query that is in a format/structure compatible with the knowledge module. The AI model may transmit the transformed query to the knowledge module. Based on the query, the knowledge module may retrieve information (e.g., articles, webpage content, instruction manuals, videos, podcasts, audio, etc.) from the one or more data storages, and may provide the AI model access to the retrieved information. For example, the knowledge module may generate a prompt that includes the query (or the inquiry submitted by the user) and the retrieved information, and provide the prompt to the AI model. In some embodiments, the AI model may be configured and trained to generate content (e.g., an answer) in a natural language format to the user inquiry based on the prompt. The AI model may then transmit the answer or a response to the inquiry to the user device via the chat interface. In some embodiments, the knowledge module may be implemented using techniques described in U.S. patent application Ser. No. 18/473,989 titled "Knowledge Bot as a Service" to Addanki et al., which is incorporated herein by reference in its entirety.

In some embodiments, in addition to providing relevant information associated with the organization to the users, the AI model may also provide additional services, such as processing one or more transactions for the users via the natural dialogues. For example, when the user asks about performing a transaction (e.g., performing a payment transaction, performing a purchase transaction, performing a data access transaction, performing a physical area access transaction, etc.), instead of instructing the user how to initiate the transaction via the platform, the AI model may enable the transaction to be performed for the user, through one or more backend modules that are configured to perform the transaction for the user. As such, in addition to the knowledge module, the computer framework may provide other computer modules (e.g., transaction processing modules) that are configured to perform various transactions for the organization. For an organization that provides online payment services to users, the various backend modules may be configured to perform services related to managing and/or modifying data associated with a user account (e.g., changing passwords, accessing and/or changing personal information, etc.), performing a payment transaction, providing specific content, processing a dispute associated with a transaction, and possibly other transaction services.

Each of the backend modules may be a computer module (e.g., a software module, etc.) that is configured to perform a transaction for the AI model via one or more application programming interfaces (APIs). For example, one or more of the backend modules may be configured to access data storages associated with the organization, and retrieve content (e.g., webpages, articles, instruction manuals, etc.) that are related to a user query. Other backend modules may be configured to process various types of transactions (e.g., a dispute transaction, a payment transaction, a data access transaction, an account management transaction, etc.) for the AI model. In some embodiments, at least some of the backend modules may use services from one or more backend processors for performing the transactions. The backend processors may be associated with the organization or a third-party entity (e.g., a financial institution, etc.).

However, different backend modules may be configured to communicate using different communication protocols (e.g., API calls) and may require different data types or content for processing the corresponding transactions. Furthermore, the organization may add additional backend modules (e.g., to accommodate a new type of transaction service, etc.) and/or modify existing backend modules (e.g., to accommodate a new processing flow, to accommodate a new data type or content requirement, etc.). As such, it can be challenging for the AI model to learn how to (1) generate instructions in the correct format/structure for each backend module and (2) determine what data is required from the user such that the AI model can provide the required data to the backend modules.

To improve the flexibility and scalability of the AI-based conversation system, the computer framework according to various embodiments of the disclosure, may enable different specifications (also referred to as "prompt templates") corresponding to the different backend modules to be provided to the AI model to facilitate the communications between the AI model and the various backend modules. In some embodiments, the specifications may be stored in a data storage that is separate from the AI-model (e.g., not integrated within the AI model), such that the specifications can be accessible by a user and/or an external module for updating. The specifications may be generated in different formats, such as a text format, an XML format, a JSON format, etc. In some embodiments, a specification may be generated for each backend module.

Each specification may include information related to how to communicate with the corresponding backend module. For example, each specification may include a description of the backend module (e.g., the transaction type that the corresponding backend module is capable of performing), one or more API calls usable for communicating with the corresponding backend module, the functionality (e.g., an expected result) for each API call, a list of input parameters (e.g., required parameters, optional parameters, etc.) for each API call, and other information. In some embodiments, each specification includes information that is usable by the AI model to generate (1) one or more questions for prompting the user for any missing information that is required for performing the transaction and (2) instructions (e.g., one or more API calls) for the backend module to perform the transaction. For example, a specification corresponding to a backend module that is configured to process a payment transaction may specify one or more API calls for instructing the backend module to process a specific payment transaction. The specification may also specify various input parameters for the API calls, where the input parameters correspond to various data types or content that are required by the backend module to process the payment transaction, such as information associated with a funding source, an identity of a recipient, etc.

In some embodiments, in order to improve the efficiency of the AI-based conversation system, the computer framework may provide a conversation management module within the AI-based conversation system for selecting a specification and providing the specification to the AI model based on a user request, such that the frequency of using the AI model (which typically consumes substantially more computer processing power and time than other computer modules) can be reduced. The conversation management module may be coupled to the chat interface, the AI model, and the data storage that stores the specifications within the AI-based conversation system. Thus, when the AI-based conversation system receives an utterance (e.g., text or voice) from the user via the chat interface, the conversation management module may analyze the utterance to determine or predict an intent of the user. When the conversation manager module determines that the utterance is associated with a request for processing a transaction (e.g., accessing/changing user data associated with an account, processing a payment transaction, processing a dispute, etc.), the conversation management module may determine a backend module that is capable of performing the requested type of transaction for the user based on the request. The conversation management module may then retrieve, from the data storage, the specification that corresponds to the backend module, and provide the utterance from the user and the specification to the AI model (e.g., as a prompt for the AI model). In some embodiments, based on the prompt, the AI model may determine the data types or content that are required by the corresponding backend module. The AI model may generate an API call template based on the specification. The API call template may include the name of the API call, and all of the input parameters required by the API call. In some embodiments, the API may initialize the input parameters with a placeholder value (e.g., a null value, etc.). The AI model may then attempt to fill the input parameters with actual value based on the user request (e.g., the utterance received from the user).

In some embodiments, the AI model may analyze the request and may extract data from the request that is usable for the API call. For example, when the user submits the utterance "I would like to send a payment to John Smith," the AI model may extract the name "John Smith" and generate a value (e.g., an account number of an account corresponding to John Smith, etc.) for the input parameter corresponding to the recipient of the transaction for the API call. The AI model may review the API call template, and may determine if any data is missing in the API call template. In this example, the AI model may determine that a payment amount and information associated with a funding source is missing in the API call template. As such, the AI model may generate content that asks the user for the payment amount and funding source information. For example, the AI model may generate an utterance "How would you like to pay John Smith and for how much?"

In some embodiments, before generating the content that asks the user for the missing information, the AI model may also retrieve additional information about the user (e.g., funding source information that has been provided by the user to the organization previously). For example, the AI model may generate instructions (e.g., API calls) to another backend module (e.g., the backend module that is configured to access user information) to retrieve information of one or more funding sources associated with the user. The AI model may then generate the content to ask the user to confirm which of the funding sources that the user would like to use for paying John Smith.

The AI model may be required to facilitate multiple dialogues with the user in order to obtain all of the data required for the API call. For example, when multiple data types or content in the API call template are missing, the AI model may generate multiple utterances to ask the user to provide data corresponding to the multiple data types or content. In another example, the user may not provide any useful data for the transaction or provide the wrong type of data after an initial attempt, and the AI model may be required to repeat the utterance or generate another utterance to ask for the same type of data (e.g., asking the question in a different way, using different words or phrases, etc.) before obtaining the correct data for the API call template.

Once the AI model determines that all of the input parameters in the API call template have been filled, the AI model may generate the API call based on the API call template. The AI model may also transmit the API call (that includes all of the input parameters) to the backend module for processing the transaction. After processing the transaction based the API call, the backend module may transmit an output to the AI model (e.g., one or more return values from the API call, etc.). The output may indicate whether the transaction has been processed successfully (e.g., whether the transaction has been authorized or declined, whether information that is requested in the API call is available, etc.) or whether additional information from the user is required to complete the transaction. The AI model may generate content based on the output from the backend module, and may transmit the content to the user via the chat interface. For example, if the payment transaction for John Smith has been successfully processed, the AI model may generate an utterance "The payment to John Smith has been successfully processed," and transmit the utterance to the user. If the output indicates that additional information is required, the AI model may generate content that prompts the user for the additional information.

The separation of the communication protocols associated with the backend modules from the AI model enables the AI-based conversation system to be more flexible and scalable. For example, when a new backend module is integrated within the AI-based conversation system, the organization may simply generate a new specification for the new backend module, and add the new specification to the data storage. The organization may also configure the conversation management module to recognize a new transaction type corresponding to the new backend module such that the conversation management module may select the new specification for providing to the AI module when a user utterance that is associated with the new transaction type is received by the AI-based conversation system. In another example, when a backend module is modified (e.g., requiring different input parameters, different API call formats, etc.), the organization may amend the specification associated with the backend module based on the modification. As such, no changes (e.g., modification to the parameters of the AI model) or re-training to the AI model is necessary to accommodate any expansion and/or modification to the backend modules.

The inclusion of the conversation management module may provide additional benefits for the AI-based conversation system. In some embodiments, the conversation management module may perform additional processing to the utterances from the user before providing the processed utterances to the AI model, and perform additional processing to the content generated by the AI model before providing the processed content to the user. For example, the conversation management module may perform translation services to the utterance/content. When the conversation management module detects that the language used in the utterance submitted by a user does not correspond to the particular language used by the AI model, the conversation management module may first translate the utterance from the original language to the particular language, and may pass the translated utterance to the AI model. Similarly, when the conversation management module receives content (e.g., a response utterance, etc.) from the AI model in the particular language that is intended for the user, the conversation management module may translate the response utterance from the particular language to the language used by the user before passing the translated content to the user via the chat interface.

The conversation management module may also perform content moderation services to the utterances. For example, when the conversation management module detects that the utterance submitted by a user does not correspond to any question or transaction type associated with the organization (e.g., questions or requests that are not related to the organization), the conversation management module may automatically respond with a pre-generated message, such as "we cannot help you with this request," without passing the utterance to the AI model. This way, computer processing resources can be preserved as the AI model does not need to process unnecessary requests from the users.

In some embodiments, the conversation management module may also perform data sanitization services on the utterances. For example, the conversation management module may remove any words or phrases from the utterance submitted by the user that are not useful or needed for the AI model to generate an answer (e.g., redundant words, words or phrases that are not related to an intent detected by the conversation management module, offensive languages, etc.). By removing unnecessary words or phrases before passing the utterances to the AI model for processing, the conversation management module further preserves the computer processing resources that are consumed by the AI model.

In some embodiments, the conversation management module may perform these services to the utterances by executing one or more external tools (e.g., other software modules). The tools (e.g., the executable software modules) may be stored within a storage area (e.g., a data storage or a folder on a device, etc.) that is accessible by the conversation management module. The separation of logic for performing the services from the conversation management module further improves the flexibility and scalability of the AI-based conversation system. For example, the tools within the storage area may be updated without requiring any modification and/or re-compiling of the conversation management module. In some embodiments, the computer framework may also provide, to the conversation management module, tool execution information that specifies the logic for executing different tools for different situations (e.g., different attributes associated with the utterances). For example, the tool execution information may specify the execution of a translation tool when an utterance is detected to be in a different language than the one used by the AI model. The tool execution information may also specify the execution of a data sanitization tool for all utterances. The tool execution information may be saved in a separate file, such as a text file, an XML file, a JSON file, etc., such that the logic can also be modified without requiring any changes to the conversation management module. When the conversation management module receives an utterance, the conversation management module may access the tool execution information, and execute one or more tools according to the tool execution information. This way, the tools can be provided to the conversation management module in a plug-and-play manner. For example, when a tool is added to the storage area (e.g., a new process for processing utterances is generated, etc.) or removed from the storage area (e.g., an old process is no longer needed for the AI-based conversation system, etc.), only the tool execution information is required to be modified.

As such, when the AI-based conversation system receives an utterance from the user (or from the AI model), the conversation management module may analyze the utterance to detect one or more attributes (e.g., the language used in the utterance, an intent detected, an origin of the utterance, etc.). The conversation management module may then access the tool execution information, and execute one or more tools from the storage area based on the one or more attributes associated with the utterance and according to the tool execution information.

As discussed herein, the AI-based conversation system may conduct conversations with various users in different chat sessions. The AI-based conversation system may use the AI model to provide different information related to the organization to the users, and may also process different transactions for the users. One aspect of maintaining the AI-based conversation system is to evaluate the performance of the different components of the AI-based conversation system such that the different components can be improved over time. However, unlike other machine learning models where a predicted outcome/result can be subsequently verified (e.g., using ground truths), it can be a challenge to determine the quality of the utterances and the instructions generated by the AI model.

In some embodiments, the computer framework may provide and configure an evaluation module to evaluate the performance of the AI-based conversation system. The evaluation module of some embodiments may evaluate the performance of the AI-based conversation system based on a set of metrics. The set of metrics may correspond to different characteristics of the content generated by the AI model and/or the overall conversation conducted by the AI model. For example, the set of metrics may include one or more metrics that measure the quality of utterances provided by the user, one or more metrics that measure the quality of each content generated by the AI model and provided to a user, one or more metrics that measure the quality of the instructions generated by the AI model for one or more backend modules, and one or more metrics that measure the quality of the overall conversation between the AI-based conversation system and the user.

In order to evaluate each content, the evaluation module may generate (or otherwise obtain) benchmark content associated with various topics, such that the quality of content generated by the AI model can be determined based on comparing the content against a corresponding benchmark content. The content generated by the AI model can be divided into at least two categories. For example, a first category may be related to answers generated by the AI model in response to inquiries submitted by users and a second category may be related to prompts generated by the AI model for obtaining information from the users. Additional categories can also be contemplated, such as instructions generated by the AI model for other computer modules, etc. In some embodiments, the evaluation module may generate various benchmark content related to different potential inquiries that can be submitted by users (e.g., utterances that provide different information associated with the organization), and various benchmark contents related to prompting users for different information based on the specifications associated with the backend modules.

When the evaluation module receives content generated by the AI model (e.g., during a chat session, etc.), the evaluation module may first determine a semantic quality of the content by comparing the meaning of the content generated by the AI model against the meaning of the corresponding benchmark content. For example, the evaluation module may use a machine learning model to derive a set of vectors based on the content generated by the AI model, and also use the machine learning model to derive a set of vectors based on the corresponding benchmark content. The evaluation module may then compare the two sets of vectors to determine a semantic similarity between the AI model-generated content and the benchmark content.

If the content is generated by the AI model in response to a question submitted by a user, the evaluation may indicate how well the content answers the question. If the content is generated by the AI model to prompt the user for specific information, the evaluation may indicate whether the content prompts the user for the correct type of information.

In some embodiments, the evaluation module may also evaluate a syntactical quality of each content. The syntactical quality of a content can be measured by a tone, a choice of words/phrases, a clarity, and/or a conciseness of the utterance, beside other characteristics. For example, the evaluation module may determine a preferred syntactical quality for the content generated by the AI model, based on factors such as an identity and attributes (e.g., an age, a location, etc.) of the user for which the utterance is intended, a tone of other utterances submitted by the user, and a responsiveness of the user during prior exchanges (e.g., previous turns of dialogues between the AI model and the user, etc.). The evaluation module may then determine how similar is the syntactical quality of the content generated by the AI model to the preferred syntactical quality.

In some embodiments, the evaluation module may also determine the syntactic quality of the content based on an utterance submitted by the user after the content is provided to the user. For example, if the user does not provide the correct type or content of data as prompted by the AI module, the evaluation module may determine that the syntactical quality of the content is low. The evaluation module may also determine whether to improve the content based on the syntactic quality. For example, if it is determined that the syntactical quality of the content is below a threshold, the evaluation module may cause the AI model to generate another inquiry for prompting the user for the same type of data using a different syntax or wording.

In some embodiments, the evaluation module may also evaluate the quality of the overall conversation between the AI model and the user during a chat session. The evaluation module may determine the conversation metric for the conversation based on a number of factors, such as a number of dialogue turns between the AI model and the user. A conversation between the AI model and the user may include multiple dialogue turns, where each dialogue turn includes a pair of exchanges between the user and the AI model (e.g., one or more utterances from the user and one or more responses from the AI model). The number of dialogue turns may indicate how successful the AI model is in communicating the necessary information (or questions) to the user. In some embodiments, the evaluation module may evaluate the quality of the overall conversation based on the number of dialogue turns required to complete a transaction (e.g., when the user has obtained the information being requested or when a transaction has been successfully processed by the backend modules, etc.).

The evaluation module may perform such an evaluation over different content generated by the AI model and/or over different conversations with the users of the organization. In some embodiments, based on evaluating the AI-based conversation system, the evaluation may be configured to perform one or more actions for different components of the AI-based conversation system to further improve the performance of the AI-based conversation system. For example, if it is determined that the quality of the content generated by the AI model is below a threshold, the evaluation module may adjust one or more parameters of the AI model such that the way that the AI model interprets a user question and/or the way that the AI model generates content is modified. In another example, if it is determined that an average number of dialogue turns exceeds a threshold, the evaluation model may determine that the AI model takes too many dialogue turns to obtain the necessary information from the users. This can be due to an internal deficiency within the AI model (e.g., the lack of ability to generate a good question, etc.) or problems related to the specifications associated with the backend modules. As such, the evaluation module may adjust one or more parameters of the AI model and/or modify one or more specifications associated with the different backend modules.

In some embodiments, after evaluating the different conversations that the AI-based conversation system conducted with various users, the evaluation module may select some of the content generated by the AI model that are determined to have qualities below the threshold, and may use such content to re-train the AI model. For example, the evaluation module may generate or obtain (from a human reviewer or from another module) content that performs the same function as the selected content generated by the AI model, and may re-train the AI model using the newly generated/obtained utterance. In another example, the evaluation module may use the AI model-generated content to perform a negative feedback training for the AI model (e.g., by labeling the content with a poor score, etc.).

By systematically evaluating the outputs generated by the AI-based conversation system and adjusting the different components within the AI-based conversation system, the evaluation module may continue to improve the performance of the AI-based conversation system.

In some embodiments, in order to further enhance the speed performance of the AI-based conversation system, the computer framework may provide a caching system for storing utterances for the AI-based conversation system. Since the AI model typically consumes a substantial amount of computer processing resources and time to dynamically generate contents (e.g., responses to user questions, prompts for users, etc.), caching frequently used/requested contents can substantially improve the response time of the AI-based conversation system. In some embodiments, the caching system may store frequently used/requested content in a memory (e.g., a SRAM, a DRAM, etc.). When a new utterance is submitted by a user, the caching system may determine whether the utterance submitted by the user corresponds to a request for any of the content stored in the cache memory. If a match exists, the caching system may retrieve corresponding content from the cache memory, and the conversation management module may transmit the corresponding content to the user via the chat interface, without using the AI model, thereby reducing the amount of time (and the required computer processing resources) to respond to the user's utterance.

In some embodiments, the caching system may include a multi-tiered structure, where each tier includes a different type of caching structure for caching/querying data. For example, a two-tiered structure can include a first tier that is associated with a lower cost (e.g., a lower consumption of computer processing resources, etc.) and lower accuracy cache querying structure, such as a lexical querying structure, and a second tier that is associated with a higher cost (e.g., a higher consumption of computer processing resources, etc.) and higher accuracy cache querying structure, such as a semantic querying structure. However, the use of three or more cache tiers is contemplated, each with different cost, accuracy levels, etc. For the first-tier querying structure, the caching system may extract one or more keywords from each corresponding cached content, and associate the one or more keywords as keys for the corresponding content. When the AI-based conversation system receives a new utterance submitted by a user, the caching system may determine whether the new utterance matches any of the keys in the lexical querying structure. For example, the caching system may also extract one or more keywords from the new utterance, and may determine if the one or more keywords match any of the keys in the lexical querying structure. In some embodiments, the caching system may require an exact match or a fuzzy (within a threshold) match between the keywords and the keys. Once a match is identified, the caching system may retrieve the matched content from the cache memory, and the AI-based conversation system may transmit the matched content to the user via the user interface as a response to the user-submitted utterance.

While querying the cached contents using the lexical querying structure can be fast, it may produce a high level of cache misses (e.g., exceeding a threshold) because utterances submitted by the users can be worded very differently, even if they carry substantially the same meaning. As such, if no match is identified for the user-submitted utterance using the first-tier querying structure, the caching system may attempt to identify a match by using the second-tier querying structure. Since the second-tier querying structure attempts to match the user-submitted utterances to cached contents based on the actual meanings (instead of the words) of the utterances, the second-tier querying structure would produce more accurate cache matching than the first-tier querying structure.

For the second querying structure, the caching system may generate semantic representations for each of the cached contents. For example, the caching system may use a machine learning model to generate vector representations for each cached content, and associate the vector representations with the corresponding cached content as the key for the corresponding cached content. When the first-tier querying structure produces a cache miss for an utterance submitted by a user, the caching system may use the machine learning model to generate vector representations for the utterance. The caching system may then determine if there is a match between the vector representations generated based on the user-submitted utterance and any of keys. If there is a match, the caching system may retrieve the corresponding cached content and transmit to the user as a response to the user-submitted utterance via the user interface.

The multi-tiered structure provides additional enhancements to the performance of the cache system because the lower-tier querying structure (which requires substantially more computer processing resources than the higher-tier querying structure) is used only after the caching system produces a cache miss for the utterance using the higher-tier querying structure. As such, at least a portion of cache hits can be served by only using the higher-tier querying structure, which is faster and consumes less computer processing resources than the lower-tier querying structure. Furthermore, the accuracy performance of the cache system is not sacrificed since any false cache misses will be caught by subsequently using the lower-tier querying structure.

FIG. 1 illustrates an electronic transaction system 100, within which the AI-based conversation system may be implemented according to one embodiment of the disclosure. The electronic transaction system 100 includes a service provider server 130, a merchant server 120, and user devices 110 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120. The user 140 may also log in to a user account to access account services or conduct electronic transactions (e.g., data access, account transfers or payments, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110 may also include a chat client 170 for facilitating online chat sessions with another chat client (e.g., a chat client of another device, such as the user device 180, the conversation module 132 of the service provider server 130, etc.). The chat client 170 may be a software application executed on the user device 110 for providing a chat client interface for the user 140 and for exchanging (e.g., transmitting and receiving) messages with the other chat client (either via a peer-to-peer chat protocol or via a chat server). For example, during an online chat session with the conversation module 132, the chat client 170 may present a chat interface that enables the user 140 to input data (e.g., text data such as utterances, audio data, multimedia data, etc.) for transmitting to the conversation module 132. The chat interface of the chat client 170 may also present messages that are received from the conversation module 132. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is not associated with any other software applications executed on the user device 110.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 and/or the chat client 170 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.). In another example, the user 140 may use the input component to interact with the chat client 170 (e.g., to provide utterances to be transmitted to other chat clients, to a chat server, etc.). The user 140 may transmit questions/inquiries, and/or requests for performing certain tasks/transactions using the input component. In some embodiments, if the chat client 170 is integrated within another application (e.g., the UI application 112, etc.), the chat client may automatically access account data of the user via a platform (e.g., a website, etc.) accessed by the UI application, and may provide the relevant account data to another chat client or a chat server for performing the tasks/transactions.

The user device 180 may include substantially the same hardware and/or software components as the user device 110, which may be used by a user to interact with the merchant server 120 and/or the service provider server 130.

The merchant server 120, in various embodiments, may be maintained by a business entity (or in some cases, by a partner of a business entity that processes transactions on behalf of the business entity). Examples of business entities include merchants, resource information providers, utility providers, online retailers, real estate management providers, social networking platforms, a cryptocurrency brokerage platform, etc., which offer various items for purchase and process payments for the purchases. The merchant server 120 may include a merchant database 124 for identifying available items or services, which may be made available to the user devices 110 and 180 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or the user of the user device 180) may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing of electronic transactions between users (e.g., the user 140 and users of other user devices, etc.) and/or between users and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110, the user associated with the user device 180, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions. It is noted that the accounts database 136 (and/or any other database used by the system disclosed herein) may be implemented within the service provider server 130 or external to the service provider server 130 (e.g., implemented in a cloud, etc.).

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a conversation module 132 that implements the AI-based conversation system as discussed herein. In some embodiments, the conversation module 132 may provide a user interface on devices (e.g., the user device 110, the user device 180, the merchant server 120, etc.) that enables users to submit utterances, such as questions related to an organization associated with the service provider server 130, requests for performing a transaction, etc. For example, the conversation module 132 may include or have access to a chat server (not shown) that can facilitate and maintain chat sessions with different chat clients (e.g., the chat client 170, and other chat clients). The conversation module 132 may use the chat server to establish chat sessions with different chat clients, and conduct conversations with different users via the chat sessions.

Based on the user inputs (e.g., utterances submitted by the user via a chat interface from voice or text), the conversation module 132 may generate content in response to the user inputs. For example, when the user 140 of the user device 110 submits an utterance "how do I file a dispute for a transaction," the conversation module 132 may generate content (e.g., a response, etc.) related to instructions on how to file a dispute based on information related to the organization, and may transmit the generated content to the user via the chat interface as a response to the user inputs. In another example, when the user 140 of the user device 110 submits an utterance "I want to file a dispute for a transaction," the conversation module 132 may generate content (e.g., one or more prompts, etc.) that asks the user for information required to process a dispute (e.g., a selection of a particular transaction that the user wants to dispute, a reason for the dispute, etc.), and may process the transaction (e.g., the dispute transaction) for the user based on the information.

Figure 2:
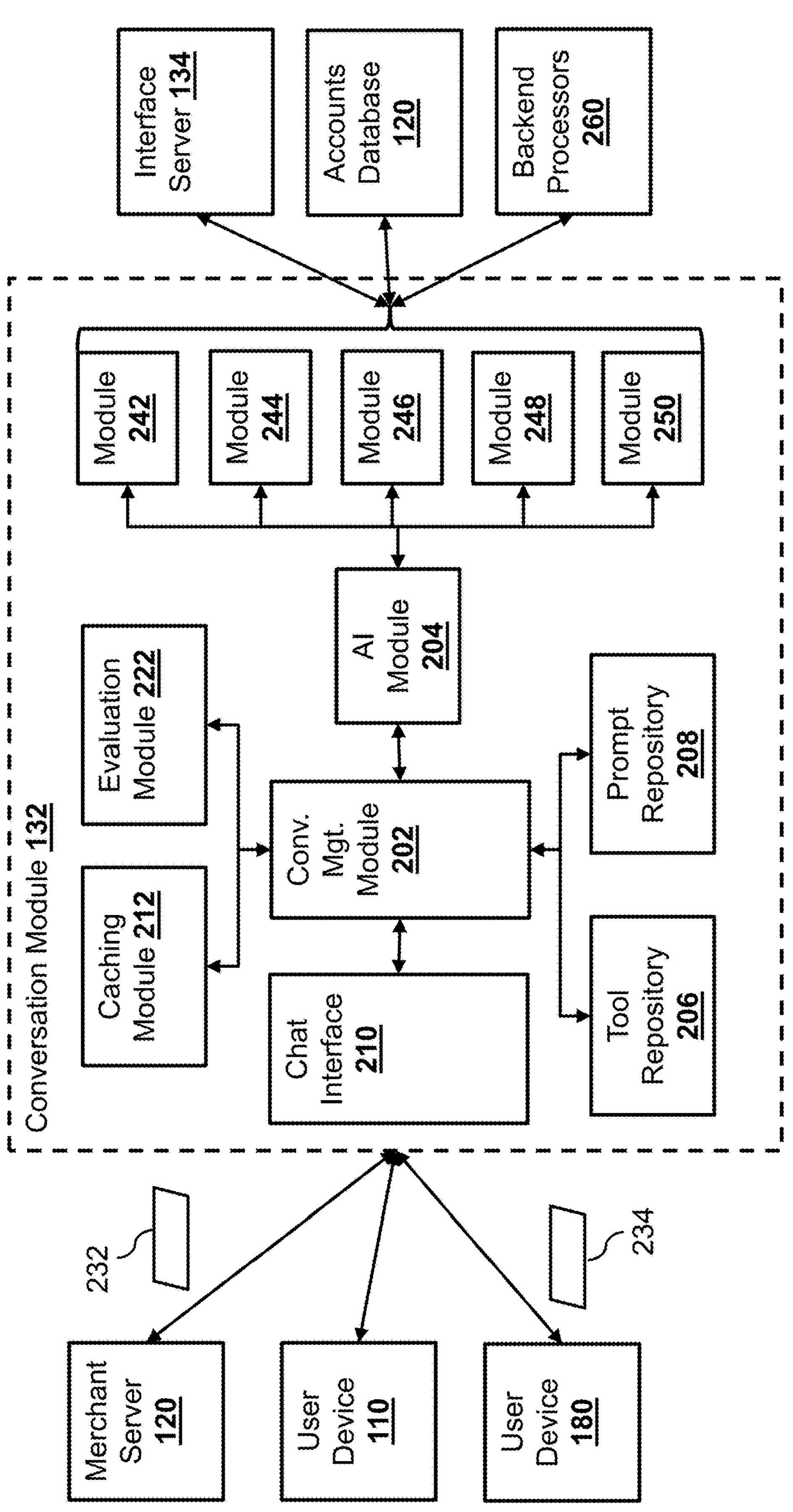
FIG. 2 is a block diagram illustrating a conversation module according to an embodiment of the present disclosure.

FIG. 2 illustrates a block diagram of the conversation module 132 according to an embodiment of the disclosure. The conversation module 132 includes a conversation management module 202, an artificial intelligence (AI) module 204, a tool repository 206, a prompt repository 208, a chat interface 210, a caching module 212, and an evaluation module 222. In some embodiments, the conversation module 132 may also include (or have access to) multiple backend modules 242, 244, 246, 248, and 250.

The chat interface 210 may be configured to establish and/or maintain communication sessions (also referred to as "chat sessions") with various chat clients of different user devices, such as the chat client 170 of the user device 110, a chat client of the merchant server 120, a chat client of the user device 180, etc. For example, when the user 140 uses the chat client 170 to initiate a chat session with the conversation module 132, the chat interface 210 may establish a chat session with the chat client 170 using a particular protocol, which includes performing one or more handshakes with the chat client 170 to establish and assign a chat identifier to the chat session. The chat interface 210 may also maintain a communication with the chat client 170 until the chat session is terminated by either the conversation module 132 or the chat client 170. As such, the conversation module 132 may receive data (e.g., an utterance 232, etc.) from users of the service provider server 130 (e.g., the user 140) via the chat interface 210.

The tool repository 206 stores various computer software programs (also referred to as "tools") that can be used by the conversation management module 202 to process an incoming utterance (e.g., the utterance 232, etc.). The prompt repository 208 stores specifications (also referred to as "prompt templates") that can be used by the AI module 204 to generate follow-up questions to the users to obtain additional information for processing a transaction, and instructions (e.g., API calls) to the backend modules 242, 244, 246, 248, and 250 for performing one or more transactions for the users. In some embodiments, the AI module 204 may include (or have access to) one or more AI models for performing the functions as disclosed herein.

Each of the backend modules 242, 244, 246, 248, and 250 may be a computer module (e.g., a software module, etc.) that is configured to perform a transaction for the conversation module 132 via one or more application programming interfaces (APIs). For example, one or more of the backend modules 242, 244, 246, 248, and 250 may be configured to access data storages associated with the organization, such as the accounts database 136, the interface server 134, and other data storages, and retrieve content (e.g., webpages, articles, instruction manuals, etc.) that are related to a user query. Other backend modules may be configured to process various types of transactions (e.g., a dispute transaction, a payment transaction, a data access transaction, an account management transaction, etc.) for the conversation module 132. In some embodiments, at least some of the backend modules 242, 244, 246, 248, and 250 may use services from one or more backend processors 260 for performing the transactions. The backend processors 260 may be associated with the service provider server 130 or a third-party entity (e.g., a financial institution, etc.).

The caching module 212 may cache frequently used content generated by the AI module 204 in a memory. If an utterance submitted by a user (e.g., the utterance 232) is matched with a cached content, the cached content can be retrieved and provided to the user without requiring the AI module 204 to process the utterance 232 in order to enhance the speed performance of the conversation module 132. In some embodiments, the evaluation module 222 may be configured to evaluation the performance of the conversation module 132, and may adjust various components of the conversation module 132 to continue to improve the performance of the conversation module 132.

As the conversation module 132 receives an utterance (e.g., the utterance 232) from a chat client (e.g., the chat client 170) via the chat interface 210, the conversation management module 202 may use one or more tools from the tool repository to perform an initial processing of the utterance. The AI module 204 may then communicate with one or more of the backend modules 242, 244, 246, 248, and 250 based on the processed utterance, and may generate a content 234 (e.g., a response to the utterance 232), which may be provided to the chat client via the chat interface 210.

Figure 3:
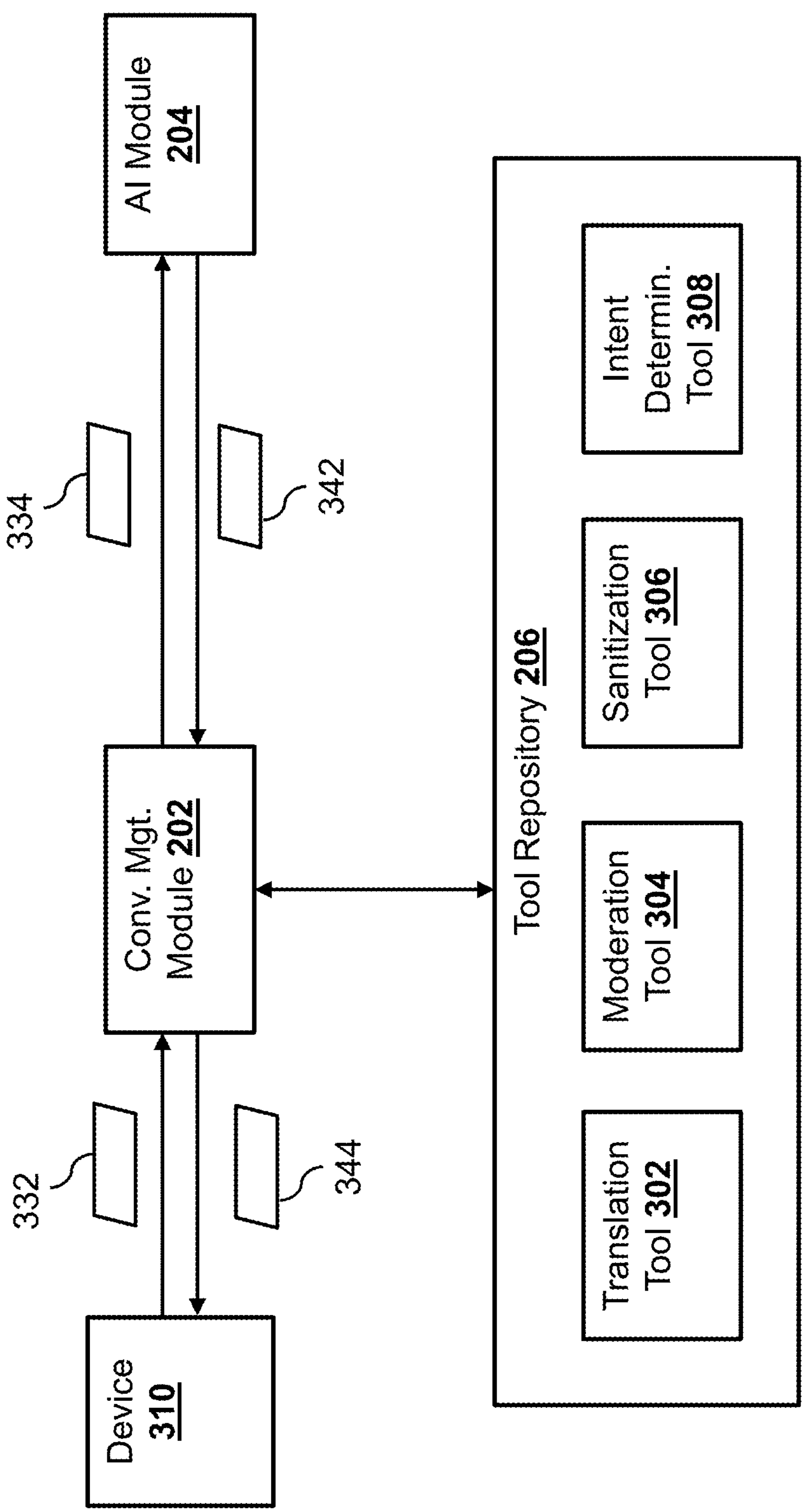
FIG. 3 illustrates an example data flow for processing utterances according to an embodiment of the present disclosure.

FIG. 3 illustrates an example flow for performing an initial processing of an utterance by the conversation management module 202 according to various embodiments of the disclosure. As shown, the tool repository 206 may include different tools, such as a translation tool 302, a moderation tool 304, a sanitization tool 306, and an intent determination tool 308. The translation tool 302 may be executed by the conversation management module 202 to detect languages or format used in the utterances and to perform transaction on the utterances. The moderation tool 304 may be executed by the conversation management module 202 to perform content moderation (e.g., removing offensive languages, detecting utterances that should not be processed by the AI module 204, etc.) on the utterances. The sanitization tool 306 may be executed by the conversation management module 202 to remove any words or phrases in the utterance that are not useful or needed for the AI module 204 to generate an answer (e.g., redundant words, words or phrases that are not related to an intent detected by the intent determination tool 308, etc.). The intent determination tool 308 may be executed by the conversation management module 202 to detect an intent associated with the utterance (e.g., what type of transactions does the user want to perform, etc.).

In some embodiments, the conversation management module 202 and/or the tool repository 206 may also store tool execution information that specifies various conditions for executing the different tools in the tool repository 206 and an order in which to execute the different tools. For example, the tool execution information may specify the execution of the translation tool 302 when the utterance 332 is detected to be in a language different from a particular language (e.g., English, etc.). The tool execution information may also specify the execution of the moderation tool 304, the sanitization tool 306, and the intent determination tool 308 for all utterances submitted by the users. The translation tool 302 and/or the intent determination tool 308 may also determine intent based on meanings associated with particular languages.

Thus, as the conversation management module 202 receives an utterance 332 from a device 310 via the chat interface 210, the conversation management module 132 may access the tool execution information, and may execute various tools in the tool repository 206 in a particular order according to the tool execution information. For example, the conversation management module 202 may execute the translation tool 302 to determine a language used in the utterance 332. If the utterance 332 is in a language different form a particular language compatible with the AI module 204 (e.g., English, etc.), the conversation management module 202 may be configured to execute the translation tool 302 on the utterance 332 to translate the utterance 332 from the original language to the particular language. After translating the utterance 332, the conversation management module 202 may execute the moderation tool 304 and the intent determination tool 308 on the utterance 332. The processed utterance 334 may then be passed to the AI module 204 for further processing (e.g., generating content for the user, processing a transaction, etc.).

Based on the processed utterance 334, the AI module 204 may generate content (e.g., a response 334) as a response for the user. In some embodiments, the conversation management module 202 may also perform certain processes to the response 334 before providing a processed response 344 to the user via the chat interface based on the tool execution information. For example, if the language used in the original utterance 332 is different from the particular language compatible with the AI module 204, the conversation management module 202 may use the transaction tool 302 on the response 342 to translate the response from the particular language to the original language used by the user of the device 310. The conversation management module 202 may then transmit a processed response 344 to the device 310 via the chat interface 210.

Figure 4:
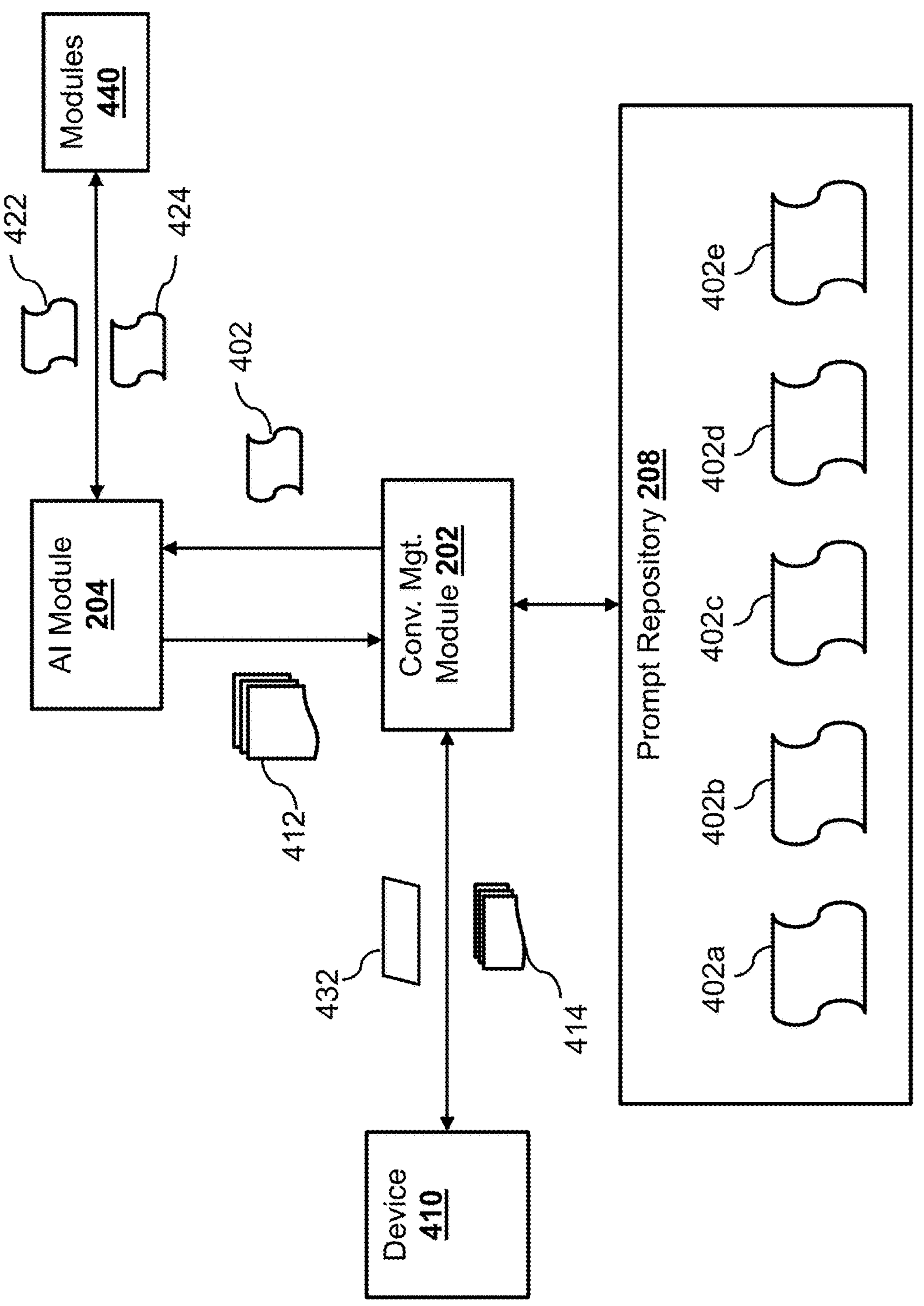
FIG. 4 illustrates an example data flow for using an artificial intelligence model to process transactions according to an embodiment of the present disclosure.

FIG. 4 illustrates an example flow for the AI module 204 to generate content according to various embodiments of the disclosure. As discussed herein, the AI module 204 is configured to interact with various backend modules 440 (which may correspond to the backend modules 242, 244, 246, 248, and 250) for performing different transactions for the user. However, different backend modules may use different interfaces (e.g., different APIs) for communicating with the AI module 204. Furthermore, different backend modules may also require different information for processing the corresponding transaction. For example, a backend module configured to manage user accounts may require an account identifier and credential for accessing a user account, whereas a backend module configured to perform a dispute transaction may require a transaction identifier associated with a transaction to be disputed and a reason for the dispute. Thus, it can be a challenge for the AI module 204 to learn all of the different interfaces for communicating with the different backend modules and the different information required by the different backend modules for processing the corresponding transactions, especially if the backend modules can be updated over time.

As such, the conversation management module 202 may use the specifications (e.g., specifications 402*a*, 402*b*, 402*c*, 402*d*, and 402*e*) stored in the prompt repository 208 to aid the AI module 204 in generating instructions (e.g., API calls) for the backend modules and obtaining the required information for processing the transactions. The specifications 402*a*, 402*b*, 402*c*, 402*d*, and 402*c* may be generated in a particular format that is interpretable by the AI module 204, such as a text format, an XML format, a JSON format, etc. In some embodiments, a specification may be generated for each backend module (e.g., generated by a human or another computer module based on analyzing requirements associated with the corresponding backend modules, etc.). For example, the specification 402*a* may be generated for one of the backend modules 440, the specification 402*b* may be generated for another one of the backend modules 440, the specification 402*c* may be generated for another one of the backend modules 440, the specification 402*d* may be generated for another one of the backend module 440, and the specification 402*e* may be generated for yet another one of the backend module 440.

Each specification may include information about how to communicate with the corresponding backend module. For example, each specification may include a description of the backend module (e.g., the transaction type that the corresponding backend module is capable of performing), one or more API calls usable for communicating with the corresponding backend module, the functionality (e.g., an expected result) for each API call, a list of parameters (e.g., required parameters, optional parameters, etc.) for each API call, and other information. In some embodiments, each specification includes information that is usable by the AI model to generate (1) one or more questions for prompting the user for any missing information that is required for performing the transaction and (2) instructions (e.g., one or more API calls) for the backend module to perform the transaction.

For example, when one of the backend modules 440 is configured to perform a payment transaction, the specification 402*a* corresponding to the backend module may specify one or more API calls for instructing the backend module to process a specific payment transaction. The specification 402*a* may also specify various input parameters for the API calls, where the input parameters correspond to various data types or content that are required by the backend module to process the payment transaction, such as information associated with a funding source, an identity of a recipient, etc.

In another example, when another one of the backend modules 440 is configured to perform a dispute transaction, the specification 402*b* corresponding to the backend module 244 may specify one or more API calls for instructing the backend module to process a specific dispute transaction. The specification 402*b* may also specify various input parameters for the API calls, such as a transaction identifier of a particular transaction, a reason for the dispute, etc.

In yet another example, when another one of the backend modules 440 is configured to retrieve knowledge about a specific topic for the AI model 204, the specification 402*e* may specify one or more API calls for instructing the backend module to retrieve data associated with the specific topic. The specification may also specify various input parameters for the API calls, such as a topic category, the user-submitted utterance, etc.

In some embodiments, as the conversation management module 202 receives an utterance 432 from a device 410, the conversation management module 202 may determine or predict an intent of a user of the device 410 based on the utterance 432. For example, the conversation management module 202 may use the intent determination tool 308 to determine an intent of the user. The intent may specify a question or a particular transaction that the user would like to perform. Based on the intent, the conversation management module 202 may determine one of the backend modules 440 that is capable of processing the user's request, and may select a corresponding specification 402 (which may be any one of the specifications 402*a*, 402*b*, 402*c*, 402*d*, 402*e* stored in the prompt repository 208, etc.) from the prompt repository 208 for that backend module 440. The conversation management module 202 may then pass the specification 402 along with the utterance 432 to the AI module 204. For example, the conversation management module 202 may generate a prompt for the AI module 204 based on the specification 402 and the utterance 432 and transmit the prompt to the AI module 204.

Based on the prompt generated by the conversation management module 202, the AI module 204 may generate different content to process the user's request. For example, if the user asks for certain information about the organization (e.g., "how to display a QR code on my phone?"), the AI module 204 may generate instructions 422 (e.g., an API call, etc.) for one or more of the backend modules 440 (which in this example, corresponds to the backend module 250) for retrieving information related to displaying QR code. In some embodiments, the instructions 422 may include a function name corresponding to a function (e.g., the API call, etc.) and input parameters associated with the function (e.g., retrieveInfo("display QR"), etc.). On the other hand, if the user requests to perform a transaction (e.g., "I would like to file a dispute"), the AI module 204 may determine whether all of the information required by one of the backend modules 440 (which in this example, corresponds to the backend module 244) to perform the dispute transaction has been obtained. In some embodiments, the AI module 204 may refer to the specification 402 to determine all of the data fields required by one of the backend modules 440 (e.g., user account identifier, transaction identifier, reason for the dispute, etc.). The AI module 204 may attempt to fill the data fields with data available to the AI module 204 (e.g., data that can be extracted from the utterance 432 or the chat session, etc.). The AI module 204 may then determine if any of the data fields has missing data, and if so, the AI module 204 may generate questions 414 for prompting the user of the device 410 for the missing data.

The AI module 204 may continue to extract data from one or more utterances submitted by the user of the device 410, and use the extracted data to fill in the data fields in the specification. In some cases, the AI module 204 may be required to transmit multiple questions to the user to obtain all of the missing data, possibly because the AI module 204 cannot ask for all of the missing data in a single question, or the user does not provide the correct type of data immediately following the question. After obtaining all of the required data, the AI module 204 may generate instructions 422 (e.g., one or more API calls with the input parameters, etc.) for the backend module 440.

The backend module 440 may process a transaction based on the instructions 422 provided by the AI module 204. After processing the transaction, the backend module 440 may return an output 424. If the backend module 440 corresponds to the backend module 250 and is configured to retrieve information for the AI module 204, the output 424 may include all of the information that the backend module 440 has retrieved based on a specific topic. If the backend module 440 is configured to process a transaction, the output 424 may indicate whether the transaction has been processed successfully.

The AI module may generate content 412 (e.g., a response to the user's utterance 432) based on the output 424. In some embodiments, the conversation management module 202 may provide the content 412 to the device 410 via the chat interface 210.

In some embodiments, there is a 1:1 correlation between the number of specifications and the number of backend modules, such that each specification corresponds to a distinct backend module. By using the conversation management module 202 to dynamically select different specifications from the prompt repository 208 for the AI module 204, the conversation module 132 becomes more flexible and scalable. For example, a new backend module can be easily integrated within the conversation module 132 by simply generating a new specification for the new backend module, and add the new specification to the prompt repository 208. The conversation management module 202 may be configured to recognize a new transaction type corresponding to the new backend module such that the conversation management module 202 may select the new specification for the AI module when a transaction of the new transaction type is requested by a user during a chat session. In another example, when any one of the backend modules 242, 244, 246, 248, and 250 is modified (e.g., requiring different input parameters, different API call formats, etc.), the corresponding specification stored in the prompt repository 208 may be amended based on the modifications. As such, no changes (e.g., modification to the parameters of the AI model 204) or re-training to the AI model 204 is necessary to accommodate any expansion and/or modification to the backend modules 242, 244, 246, 248, and 250 of the conversation module 132.

Figure 5:
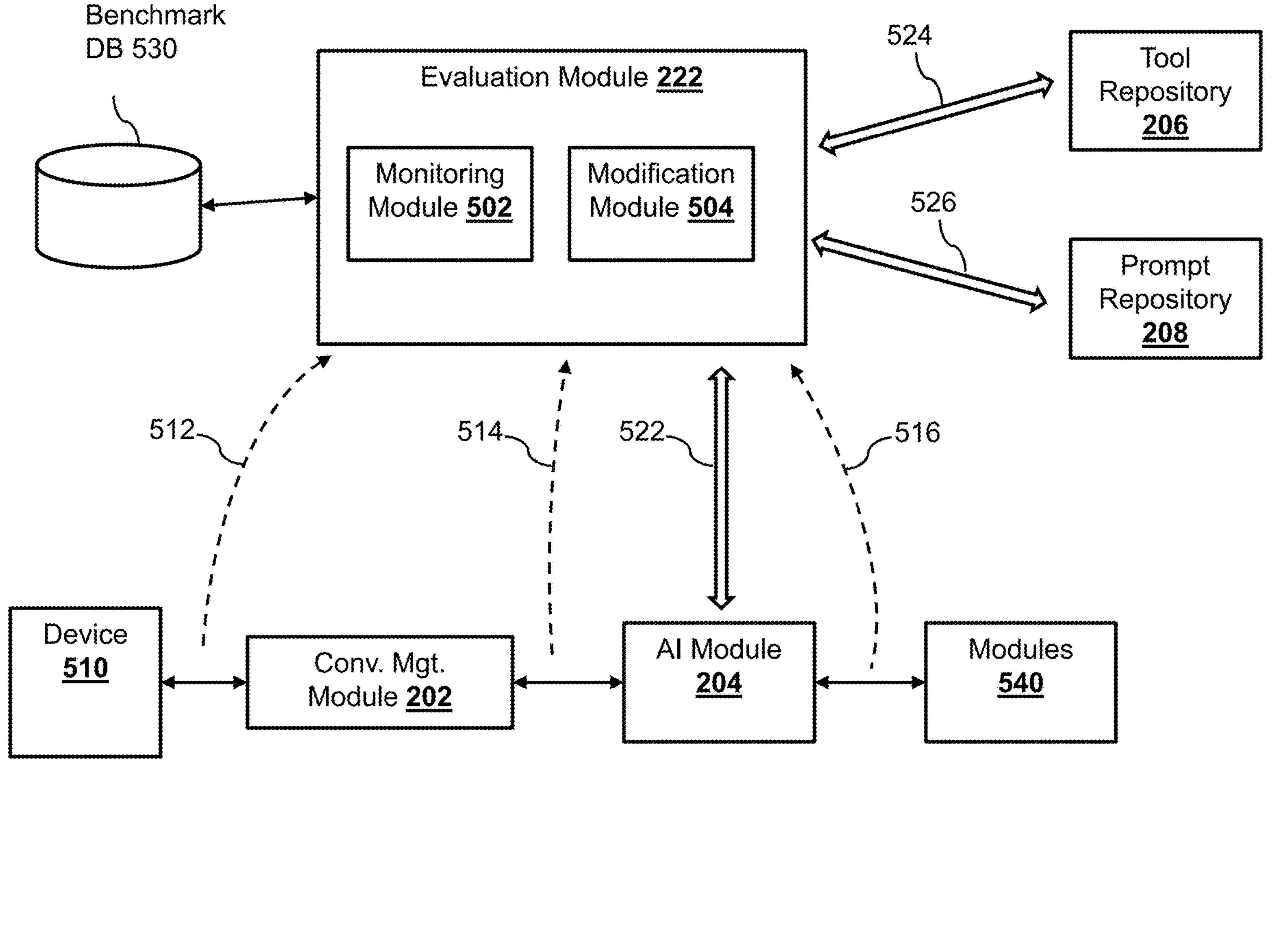
FIG. 5 is a block diagram of an evaluation module according to an embodiment of the present disclosure.

FIG. 5 illustrates a block diagram of the evaluation module 222 according to various embodiments of the disclosure. As shown, the evaluation module 222 includes a monitoring module 502 and a modification module 504. In some embodiments, the monitoring module 502 may be configured to monitor activities related to the conversation module 132. For example, after the conversation module 132 establishes a chat session with a device 510, the evaluation module 222 may use the monitoring module 502 to begin monitoring the interactions between the device 510 and the conversation module 132 during the chat session and the interactions among different components in the conversation module 132 for the chat session. The interactions may include utterances that the device 510 transmits to the conversation module 132 during the chat session and content that the conversation module 132 transmits to the device 510 in response to the utterances. The interactions may also include communications that the conversation management module 202 provides to the AI module 204, such as processed utterances, specifications that the conversation management module 202 retrieves from the prompt repository 208, etc., and content generated by the AI module 204 and provided to the conversation management module 202. The interactions may also include instructions generated by the AI module 204 and provided to the backend modules 540 (which may correspond to the backend modules 242, 244, 246, 248, and 250), and outputs generated by the backend modules 540 and provided to the AI module 204.

In some embodiments, the evaluation module 222 may use a set of metrics to evaluate the performance of the conversation module 132 and also the performance of different components of the conversation module 132 based on the monitored interactions. The set of metrics may correspond to different characteristics of the interactions monitored by the evaluation module 222. For example, the set of metrics may include one or more metrics that measure the quality of the processed utterance provided by the conversation management module 202 to the AI module 204, one or more metrics that measure the quality of content generated by the AI module 204 and provided to the device 510 in response to one or more user-generated utterances, one or more metrics that measure the quality of the instructions generated by the AI model 204 for the backend modules 540, which may correspond to the backend modules 242, 244, 246, 248, and 250 in FIG. 2 for processing transactions, and one or more metrics that measure the quality of the overall conversation between the conversation module 132 and the device 510.

In order to evaluate the content generated by the AI module 204, the evaluation module 222 may generate (or otherwise obtain) benchmark contents associated with various topics, such that the quality of the contents generated by the AI module 204 can be determined based on comparing the generated content against a corresponding benchmark content. As such, the evaluation module 222 may be communicatively coupled with a benchmark database 530 that stores the benchmark content corresponding to various topics. In some embodiments, the benchmark database 530 may include benchmark answers that are related to potential questions (or previously asked questions) that can be transmitted by users (e.g., the user of the device 510, etc.). For example, the benchmark answers may provide information related to various topics associated with the organization, such as "how to file a dispute," "how to track a package," "how does the 'pay-it-later' program work," etc. The benchmark answers may be generated by humans or pre-generated by the AI module 204 (and optionally reviewed and/or edited by humans). The benchmark database 530 may also include benchmark questions that are related to various data types or content for which the AI module 204 may prompt the users in order to process requested transactions based on the various specifications, such as specifications 402*a*, 402*b*, 402*c*, 402*d*, and 402*c*.

When the monitoring module 502 accesses a content (which can include an answer to the user-generated utterance, or a question for prompting the user for specific types of data) generated by the AI module 204 and provided to the device 510, the evaluation module 222 may determine if a benchmark content stored in the benchmark database 530 corresponds to the content generated by the AI module 204. If a corresponding benchmark content is stored in the benchmark database 530, the evaluation module 222 may compare the content generated by the AI module 204 against the corresponding benchmark content.

In some embodiments, the evaluation module 222 may evaluate the semantic quality of the content and the syntactic quality of the content. For example, the evaluation module 222 may generate vector representations that represent the meanings of the benchmark content, and may also generate vector representations that represent the meanings of the content generated by the AI module 204. The evaluation module 222 may then compare the vector representations of the benchmark content and the vector representations of the content generated by the AI module 204. The evaluation module 222 may determine the semantic quality of the content generated by the AI module 204 based on how similar the vector representations are between the benchmark content and the content generated by the AI module 204 (e.g., a distance between the vector representations of the benchmark content and the vector representations of the content generated by the AI module 204 in a multi-dimensional plane). The more similar (e.g., the shorter the distance) between the vector representations, the higher the semantic quality is determined for the content.

The evaluation module 222 may evaluate different content generated by the AI module 204 for different users. If it is determined that the semantic quality of the content generated by the AI module 204 is below a threshold quality, the evaluation module 222 may use the modification module 504 to adjust the AI module 204 (e.g., adjusting one or more parameters of the AI model of the AI module 204) and/or modifying the specification(s) from the prompt repository 208 that were used by the AI module 222 to generate the content.

The evaluation module 222 may also analyze the content generated by the AI module 204 to derive a syntactic quality for the content. For example, the evaluation module 222 may determine a tone, a choice of words/phrases, a clarity, a conciseness, and/or other characteristics of the content, and may assess whether one or more of these characteristics of the content is appropriate for the user of the device 510. In some embodiments, the evaluation module 222 may determine the syntactic quality of the content further based on the user of the device 510. For example, if the user is relatively young (e.g., below an age threshold), the tone and the choice of words/phrases can lean toward more casual, and the content can be more concise. On the other hand, if the user is relatively mature (e.g., above the age threshold), the tone and the choice of words/phrases can lean toward more formal, and the content needs to be clearer and more elaborate. Customary meanings of words in different languages may also be considered in predicting an intent or determining an inquiry.

If it is determined that the syntactic quality of the contents generated by the AI module 204 is below a threshold, the evaluation module 222 may use the modification module 504 to modify the AI module 204 (e.g., adjusting one or more parameters of the AI model of the AI module 204, etc.).

In some embodiments, the evaluation module 222 may also evaluate the processing of the utterances by the conversation management module 202. As discussed herein, the conversation management module 202 may process utterances transmitted by the users before providing the processed utterances to the AI module 204. The conversation management module 202 may also process content generated by the AI module 204 before providing the processed content to the devices (e.g., the device 510). By comparing the pre-processed utterances/contents and the post-processed utterances/contents, the evaluation module 222 may determine a quality of the processing on the utterances/contents. If it is determined that the quality of the processing on the utterances and/or the contents is below a threshold, the evaluation module 222 may use the modification module 504 to modify the tools in the tool repository 206, such as adjusting the programming code of one or more tools in the tool repository 206.

In addition to evaluating individual data generated by different components, such as the conversation management module 202, the AI module 204, and the backend modules 540, the evaluation module 222 may also evaluate the quality of the overall conversation between the user of the device 510 and the conversation module 132. A conversation may include the interactions between the device 510 and the conversation module 132 during the same chat session. In some embodiments, the evaluation module 222 may derive different attributes associated with the conversation between the user of the device 510 and the conversation module 132 based on the interactions between the device 510 and the conversation module 132 monitored by the monitoring module 502. The attributes may include a number of dialogue turns between the device 510 and the conversation module 132. Each conversation between the conversation module 132 and a user (e.g., the conversation between the user of the device 510 the conversation module 132) may include multiple dialogue turns, where each dialogue turn includes a pair of exchanges between the user and the conversation module 132 (e.g., one or more utterances from the user and one or more responses from the conversation module 132). In some embodiments, the evaluation module 222 may evaluate the quality of the overall conversation based on the number of dialogue turns required to complete a transaction (e.g., when the user has obtained the information being requested or when a transaction has been successfully processed by the backend modules, etc.). The number of dialogue turns may indicate an efficiency of the AI module 204 in communicating the necessary information (or questions) to the user for processing a user request.

In some embodiments, the evaluation module 222 may determine benchmark dialogue turns for each type of user request (e.g., an information request, a request for processing a payment transaction, a request for processing a dispute transaction, a request for editing account information, etc.). For each request made by a user of the device 510, the evaluation module 222 may determine a number of dialogue turns conducted between the device 510 and the conversation module 132 for completing the transaction. The evaluation module 222 may compare the actual number of dialogue turns conducted between the device 510 and the conversation module 132 against a corresponding benchmark. If the number of dialogue turns exceeds the benchmark by a threshold (e.g., a 50%, 100%, etc.), the evaluation module 222 may determine that the communication between the AI module 204 and the user of the device 510 is inefficient. The evaluation module 222 may investigate further, such as by assessing the different metrics determined for the different components of the conversation module 132. Based on the different metrics, the modification module 504 may determine one or more causes for the inefficiencies, and may adjust one or more of the components of the conversation module 132 (e.g., one or more tools in the tool repository 206, one or more specifications in the prompt repository 208, one or more parameters of the AI module 204, etc.).

The evaluation module 222 may evaluate different conversations with different users to continuously monitor the quality of the different components of the conversation module 132, and may perform actions (e.g., modifying different components of the conversation module 132) to improve the performance of the conversation module 132 without requiring interference from human computer program developers.

Figure 6:
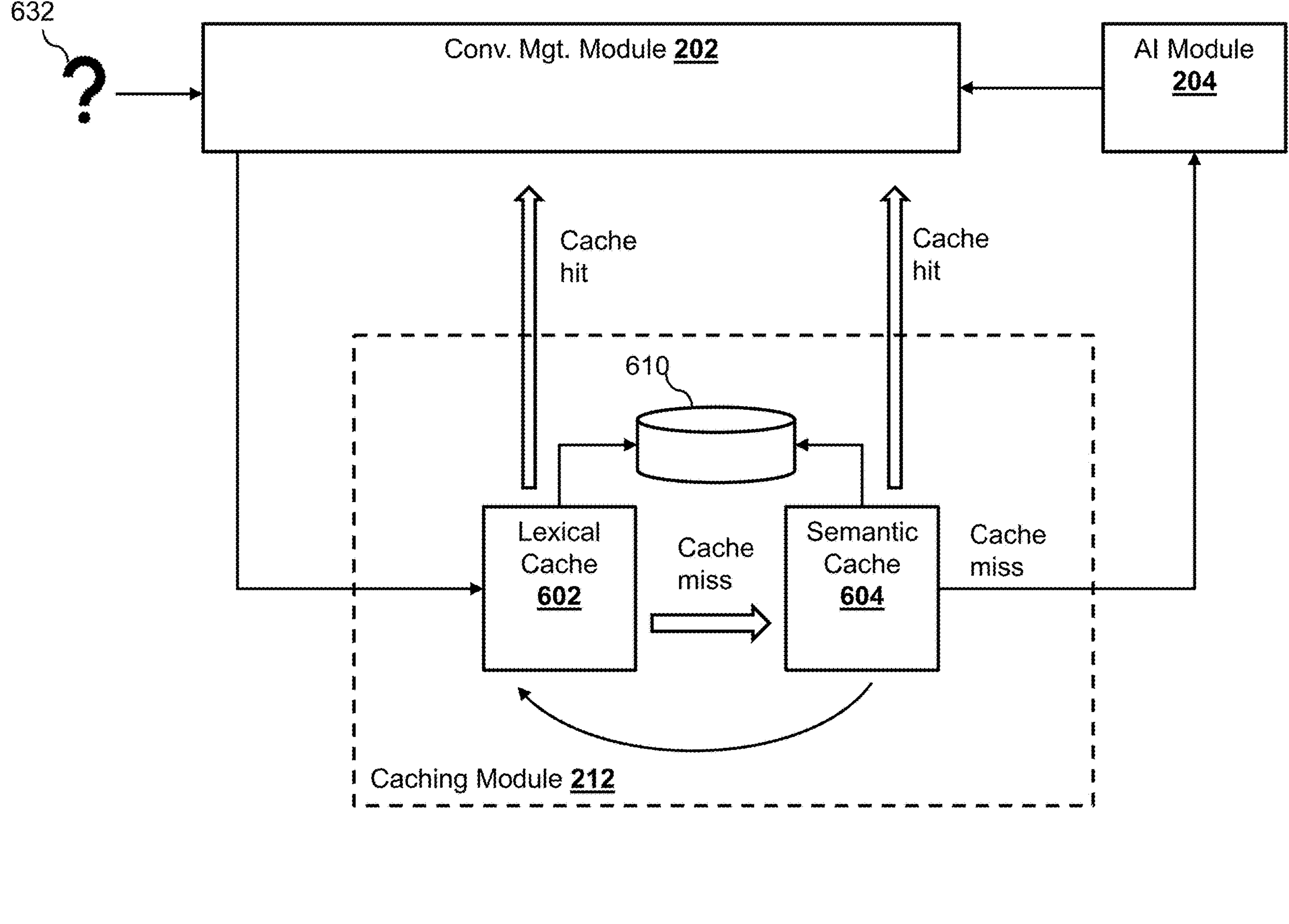
FIG. 6 is a block diagram of a caching module according to an embodiment of the present disclosure.

FIG. 6 illustrates a block diagram of the caching module 212 according to various embodiments of the disclosure. As discussed herein, in order to further enhance the speed performance of the conversation module 132, and thus efficiency and accuracy, in processing user requests, the caching module 212 may provide caching services for the conversation module 132. Since the AI module 204 typically consumes a substantial amount of computer processing resources and time to dynamically generate content (e.g., responses to user questions, prompts for users, etc.), caching frequently used/requested content can substantially improve the response time of the conversation module 132. In some embodiments, the caching module 212 may store frequently used/requested contents in a memory 610, which can be implemented within a hardware memory unit, such as a SRAM, a DRAM, etc. When a new utterance (e.g., an utterance 634 is received from a user via the chat interface 210, the caching module 212 may determine whether the utterance 634 corresponds to a request for any of the contents stored in the memory 610. If a match exists, the caching module 212 may retrieve a corresponding content from the memory 610, and the conversation management module 202 may transmit the corresponding content to the user via the chat interface 210, without using the AI module 204, thereby reducing the amount of time (and the required computer processing resources) to respond to the user's request.

In some embodiments, the caching module 212 may include a multi-tiered structure. In the example shown in FIG. 6, the caching module 212 includes two tiers: a lexical cache 602 and a semantic cache 604, however, it has been contemplated that additional tiers can be incorporated into the caching module 212 without departing from the spirit of the disclosure. The lexical cache 602 is configured to determine whether the utterance 634 corresponds to any of the cached contents based on keyword matching. For example, the lexical cache 602 may extract one or more keywords from each content stored in the memory 610, and associate the one or more keywords as keys for the corresponding content. When the conversation management module 202 receives the utterance 634 from a user, the caching module 212 may determine extract one or more keywords from the utterance 634, and determine if the one or more keywords match any of the keys in the lexical cache 602. In some embodiments, the caching system may require an exact match or a fuzzy match (inexact match within a threshold or range) between the keywords and the keys. In some embodiments, the lexical cache 602 may use a machine learning model (e.g., a neural network) to determine whether a match exists between the utterance 634 and any one of the cached contents. Once a match is identified (a cache hit), the caching module 212 may retrieve the matched content from the memory 610 and provide the content to the conversation management module 202. The conversation management module 202 may transmit the content to the device that transmitted the utterance 634 via the chat interface 210.

Querying the cached contents using the lexical cache 602 can be fast, as keyword matching does not require a substantial amount of computer processing resources. However, it may produce a high level of cache misses (e.g., exceeding a threshold) because utterances submitted by users can be worded very differently, even if they carry substantially the same meaning. As such, if no match is identified for the utterance 634 based on the lexical cache 602 (a cache miss), the caching module 212 may pass the utterance 634 to the semantic cache 604.

Unlike the lexical cache 602, the semantic cache 604 is configured to determine whether the utterance 634 corresponds to any of the cached contents based on semantic matching (e.g., whether the meanings derived from the utterance 634 match the meanings derived from any one of the cached contents). For example, the semantic cache 604 may use a machine learning model (e.g., a neural network, etc.) to generate vector representations for each cached content stored in the memory 610, where the vector representations are generated to represent the meaning of each corresponding cached content. The semantic cache 604 may associate the vector representations with the corresponding cached content as the key for the corresponding cached content. Upon receiving the utterance 634, the semantic cache 604 may also generate (using the machine learning model) vector representations based on the utterance 634, and determine if the vector representations of the utterance 634 match any of the vector representations of the cached contents stored in the memory 610. In some embodiments, a match is identified when a distance (e.g., a Euclidean distance) between the vector representations of the utterance 634 and the vector representations of a cached content is smaller than a threshold. Once a match is identified (a cache hit), the caching module 212 may retrieve the matched content from the memory 610 and provide the content to the conversation management module 202. The conversation management module 202 may transmit the content to the device that transmitted the utterance 634 via the chat interface 210.

The generation of vector representations can consume a substantial amount of computer processing resources. As such, the semantic cache 604 can consume a larger amount of computer processing resources and time to perform cache retrieval than the lexical cache 602. However, using the vector representations that represent the meaning of the utterance/content provides a higher accuracy performance of identifying matches between utterances and cached contents. As such, the arrangement of having the two-tiered structure in the cache module 212 provides an enhanced performance for the conversation module 132 because the semantic cache 604 (which requires substantially more computer processing resources and time than the lexical cache 602) is used only after the lexical cache 602 produces a cache miss for an utterance. As such, at least a portion of cache hits can be served by only using the lexical cache 602, which is faster and consumes less computer processing resources than the semantic cache 604. Furthermore, the accuracy performance of the cache module 212 is not sacrificed since any false cache misses from the lexical cache 602 will be caught by subsequently using the semantic cache 604.

In some embodiments, the caching module 212 may use information associated with the cache hit by the semantic cache 604 to improve the performance of the lexical cache 602. For example, since a cache hit from the semantic cache 604 implies that there is a cache miss from the lexical cache 602, the caching module 212 may use the data (e.g., the utterance from the user and the matched content from the cache memory 610) to re-train the machine learning model used by the lexical cache 602.

Since content that is stored in the cache memory 610 was generated by the AI module 204 based on information collected from various sources associated with the service provider server 130, it has been contemplated that the underlying information from which the cached content is derived may change (e.g., updated) over time. As such, some of the cached content may become inaccurate (e.g., out-of-date). In some embodiments, the cache module 212 may determine whether a cached content is out-of-date based on a hash value. For example, for each content generated by the AI module 204 and stored in the cache memory 610, the caching module 212 may determine all of the underlying information from which the content is generated, and generate a hash value based on the underlying information. The hash value may be referred to content signature of the content. When a cache hit is generated by either one of the lexical cache 602 or the semantic cache 604, the caching module 212 may identify the underlying information associated with the cached content, and may access the current version of the underlying information (e.g., based on a network address, etc.). The caching module 212 may generate a new hash value based on the current version of the underlying information and compare it against the content signature of the content. If the new hash value is identical to the content signature, the caching module 212 may determine that the cached content is current (e.g., within a certain time elapsed since the last cache or storage, such as 1 second, 1 minute, 1 week, or a dynamic time frame), and may provide the cached content to the conversation management module 202 for the user. However, if the new hash value is not identical to the content signature, the caching module 212 may determine that the cached content is out-of-date. The caching module 212 may request the AI module 204 to re-generate the content based on the current version of the underlying information, and store the newly generated content in the cache memory 610.

Since the cache memory 610 may be limited in storage, the caching module 212 may manage the cache memory 610 by keeping only the most frequently used/requested content in the memory 610. In this regard, the caching module 212 may determine a lifespan (e.g., a period of time, a number of cache requests received by the caching module 212, etc.). For example, when a content is added to the memory 610, the caching module 212 may initially assign a lifespan to the content. Each time the caching module 212 generates a cache hit based on the content, the lifespan of the content is extended (e.g., restart the period of time, etc.). The caching module 212 may remove, from the memory 610, any content that has expired (e.g., end of the lifespan). This way, the caching module 212 may keep only the most frequently used/requested content in the memory 610, and content that has not been retrieved for a period of time will be removed to give space to new content for caching.

Figure 7:
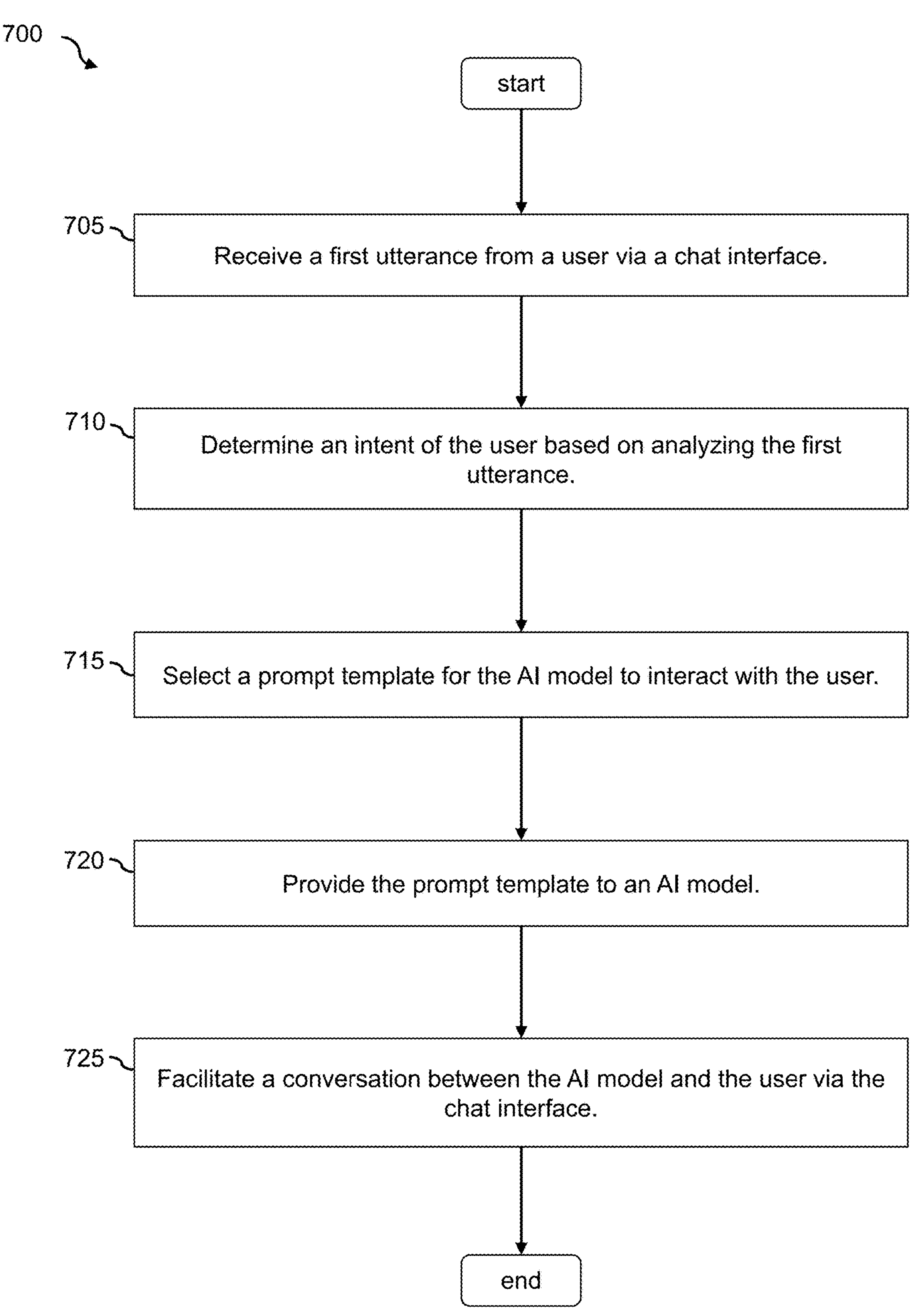
FIG. 7 is a flowchart showing a process of facilitating a conversation between an artificial intelligence model and a user according to an embodiment of the present disclosure.

FIG. 7 illustrates a process 700 for facilitating a conversation during a chat session according to various embodiments of the disclosure. In some embodiments, at least a portion of the process 700 may be performed by the conversation module 132, although one or more steps may be performed by one or more of the components/devices/modules/systems described herein. The process 700 begins by receiving (at step 705) a first utterance from a user via a chat interface and determining or predicting (at step 710) an intent of the user based on analyzing the first utterance. For example, the user 140 may use the chat client 170 to request to have, or initiate, a chat session with the conversation module 132. The conversation module 132 may establish a chat session with the chat client 170 of the user device 110 using the techniques disclosed herein. The user 140 may use the chat client 170 to exchange data with the conversation module 132 during the chat session. For example, the user 140 may transmit an utterance (e.g., one or more phrases, one or more sentences, etc. in text, voice, or other means) to the conversation module 132 via the chat client 170. Upon receiving the utterance, the conversation management module 202 may process the utterance using one or more tools in the tool repository 206 according to the tool execution information. In some embodiments, the conversation management module 202 may use the intent determination tool 308 to determine an intent of the user 140 based on the utterance. The intent determined for the user 140 may indicate a type of transaction that the user wishes to perform.

The process 700 then selects (at step 715) a prompt template for the AI model to interact with the user and provide (at step 720) the prompt template to the AI model. For example, after determining the intent of the user 140 (e.g., a type of transaction that the user wishes to perform), the conversation management module 132 may determine that a backend module (e.g., one of the backend modules 242, 244, 246, 248, and 250) is capable of processing the transaction for the user. The conversation management module 132 may then retrieve a specification (also referred to as a "prompt template") from the prompt repository 208 that corresponds to the selected backend module, and provide the specification to the AI module 204.

The process 700 facilitates (at step 725) a conversation between the AI model and the user via the chat interface. For example, based on the specification provided by the conversation management module 202, the AI module 204 may determine the types or content of data that is required by the selected backend module to process the transaction for the user. The AI module 204 may begin conducting a conversation with the user 140 via the chat interface 210.

Figure 8:
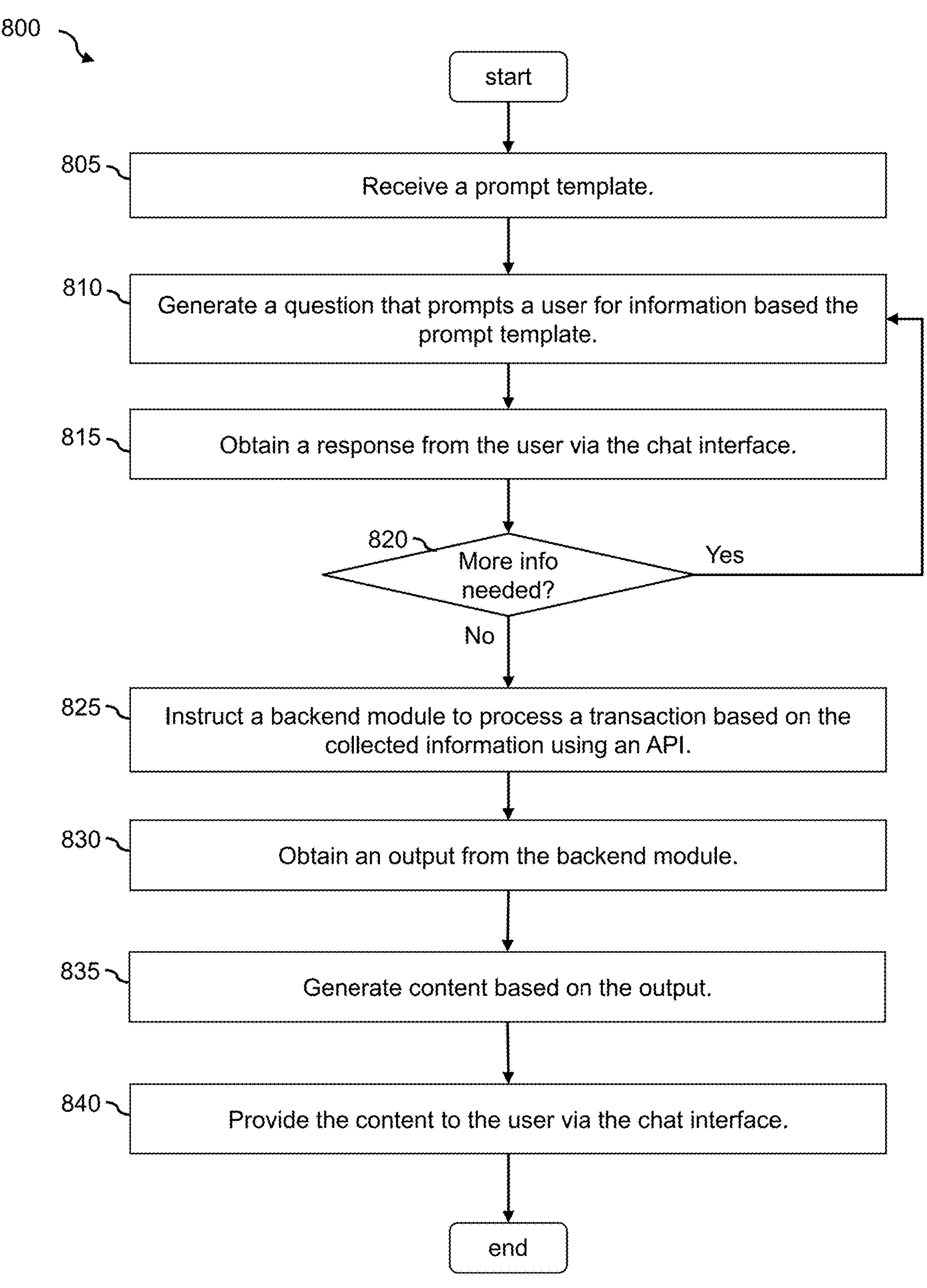
FIG. 8 is a flowchart showing a process of using an artificial intelligence model to instruct various software modules to process different types of transactions according to an embodiment of the present disclosure.

FIG. 8 illustrates a process 800 for processing a transaction for a user during a chat session according to various embodiments of the disclosure. In some embodiments, at least a portion of the process 800 may be performed by the AI module 204, although one or more steps may be performed by one or more of the components/devices/modules/systems described herein. The process 800 begins by receiving a prompt template (at step 805). For example, as discussed above by reference to FIG. 7, the AI module 204 may receive a specification from the conversation management module 202. The specification may indicate the backend module that is capable of processing a transaction that is requested by the user 140. The specification may also include information related to the interfaces (e.g., formats of the API calls, etc.) that can be used to communicate (e.g., providing instructions) with the backend module, and the types of data (e.g., input parameters) required by the backend module to process the transaction.

The process 800 generates (at step 810) a question or inquiry that prompts a user for information based on the prompt template and obtains (at step 815) a response from the user via the chat interface. The process 800 then determines (at step 820) if more information is needed. If more information is needed, the process 800 reverts back to the step 810 to generate another question that prompts the user for the missing information. For example, once the AI module 204 determines the types or content of data required by the backend module to process the transaction, the AI module 204 may generate one or more questions that prompt the user for the types or content of data required by the backend module. In some embodiments, the AI module 204 may perform one or more dialogue turns (e.g., asking multiple questions, etc.) before the AI module 204 is able to obtain all of the required data for the backend module. In some embodiments, each time the AI module 204 obtains new information from the user via the chat interface 210, the AI module 204 may insert the information into a corresponding position in the specification. The AI module 204 may determine whether there is still missing information based on the specification, and may continue to generate questions to prompt the user for the missing information until all of the required information has been obtained.

On the other hand, if no more information is needed, the process 800 instructs (at step 825) a backend module to process a transaction based on the collected information using an API. For example, the AI module 204 may generate instructions (e.g., one or more API calls) for the backend module based on the information included in the specification. The AI module 204 may also use the information obtained from the user to generate input parameters for the API calls. The AI module 204 may then transmit the instructions to the corresponding backend module.

The process 800 then obtains (at step 830) an output from the backend module, generates (at step 835) content based on the output, and provides (at step 840) the content to the user via the chat interface. For example, the backend module may be configured to process a transaction for the user based on the instructions provided by the AI module 204. After processing the transaction, the backend module may generate an output (e.g., information retrieved from various sources associated with the service provider server, a signal indicating whether the transaction has been processed successfully, etc.), and transmits the output to the AI module 204 (e.g., as a return value for the instructions). Based on the output, the AI module 204 may generate content for the user. For example, when the output includes information retrieved from various sources, the AI module 204 may generate a summary of the information. In another example, when the output indicates whether the transaction was performed successfully, the AI module 204 may generate an utterance that informs the user of the result of processing the transaction. The AI module 204 may then transmit the content to the user device 110 via the chat interface 210.

Figure 9:
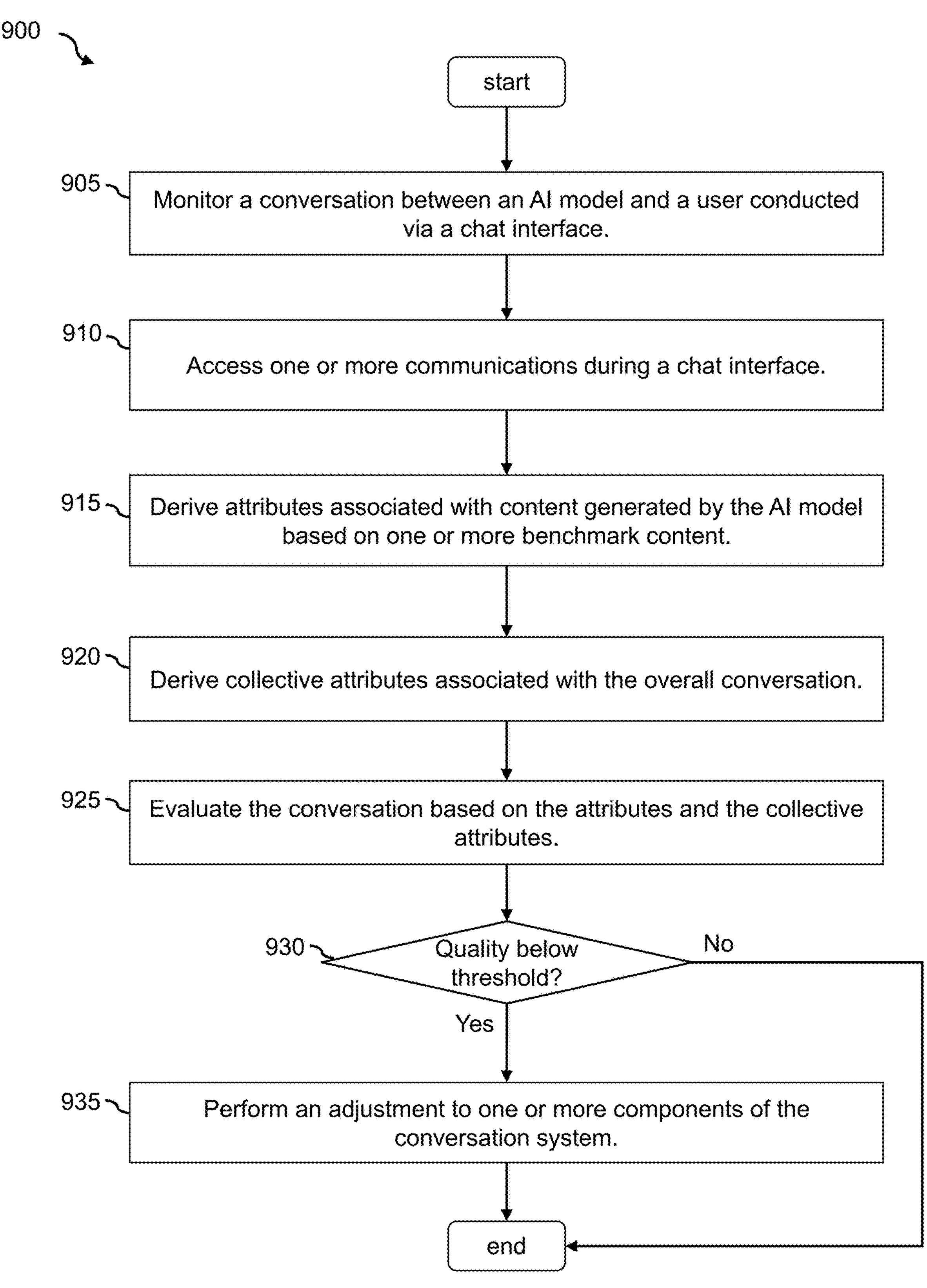
FIG. 9 is a flowchart showing a process of evaluating the quality of a conversation system according to an embodiment of the present disclosure.

FIG. 9 illustrates a process 900 for evaluating the performance of the conversation module 132 according to various embodiments of the disclosure. In some embodiments, at least a portion of the process 900 may be performed by the evaluation module 222, although one or more steps may be performed by one or more of the components/devices/modules/systems described herein. The process 900 begins by monitoring (at step 905) a conversation between an AI model and a user conducted via a chat interface and accessing (at step 910) one or more communications during a chat interface. For example, the monitoring module 502 may monitor communications between the device 510 and the conversation module 132, and data transmitted among different components of the conversation module 132 (e.g., the conversation management module 202, the AI module 204, and the backend modules 540, etc.) during a chat session with a user.

The process 900 then derives (at step 915) attributes associated with content generated by the AI model based on one or more benchmark content, and derives (at step 920) collective attributes associated with the overall conversation. For example, the evaluation module 222 may compare contents generated by the AI module 204 against benchmark contents stored in the benchmark database 530. In some embodiments, the evaluation module 222 may evaluate both the semantic quality and the syntactic quality of the contents based on the comparisons. The evaluation module 222 may also derive attributes associated with the overall conversation between the conversation module 132 and the user of the device 510. The attributes may include the number of dialogue turns conducted between the conversation module 132 and the user of the device 510 before a transaction is completed for the user.

At step 925, the process 900 evaluates the conversation based on the attributes and the collective attributes. If it is determined that the quality of the conversation is below a threshold at step 930, the process 900 performs an adjustment to one or more components of the conversation system. For example, based on the overall quality of the conversation, and the semantic and syntactic qualities of individual contents generated by the AI module 204, the evaluation module 222 may determine if the quality of the conversation is below a threshold. If the quality of the conversation is below the threshold, the evaluation module 222 may use the modification module 504 to adjust one or more components within the conversation module 132, such as adjusting one or more parameters of the AI module 204, modifying one or more tools in the tool repository 206, modifying one or more specification, and/or modifying one or more backend modules.

Figure 10:
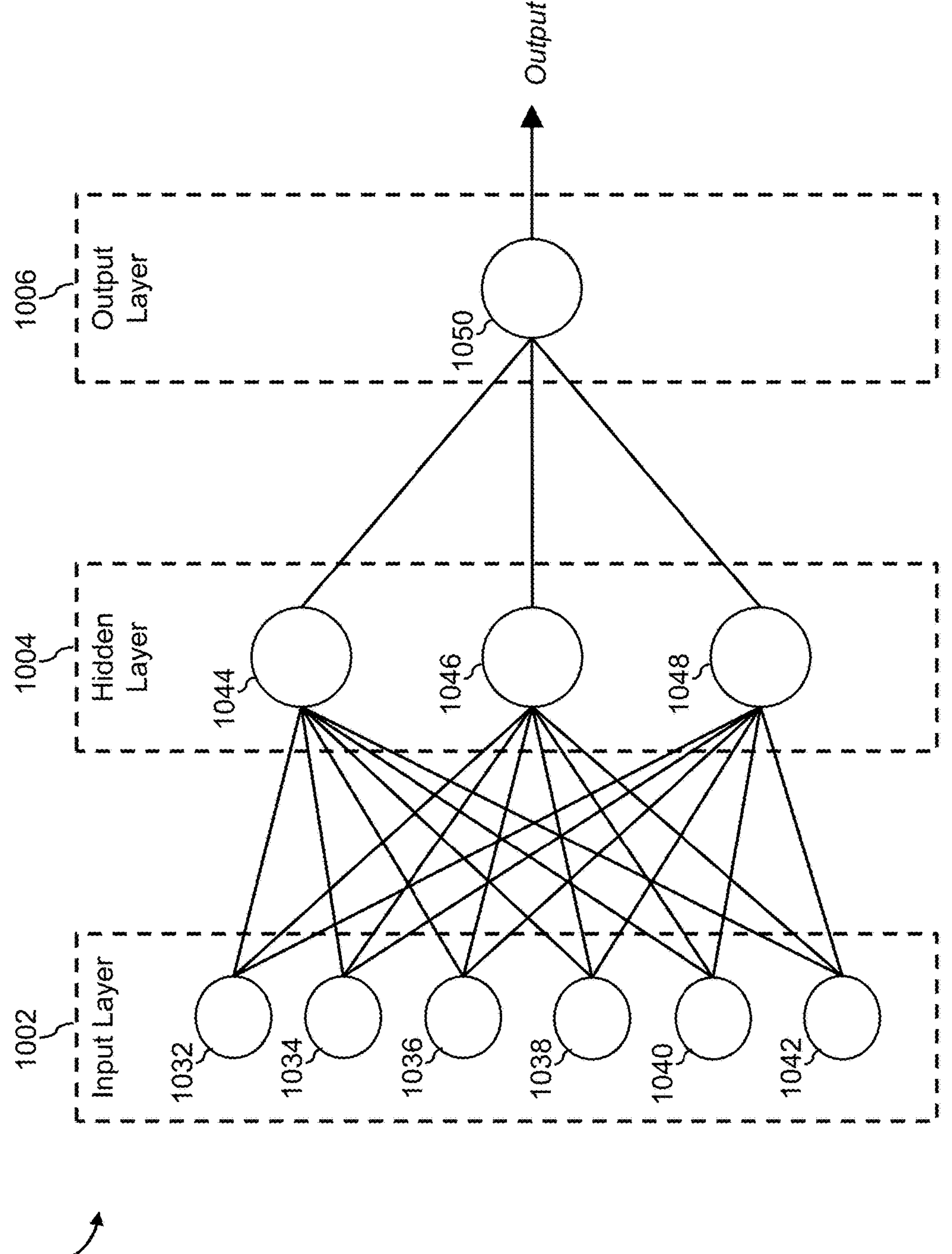
FIG. 10 illustrates an example neural network that can be used to implement a machine learning model according to an embodiment of the present disclosure.

FIG. 10 illustrates an example artificial neural network 1000 that may be used to implement a machine learning model, such as the AI model associated with the AI module 204, the machine learning model associated with the caching module 212, and the machine learning model associated with the evaluation module 222. As shown, the artificial neural network 1000 includes three layers—an input layer 1002, a hidden layer 1004, and an output layer 1006. Each of the layers 1002, 1004, and 1006 may include one or more nodes (also referred to as "neurons"). For example, the input layer 1002 includes nodes 1032, 1034, 1036, 1038, 1040, and 1042, the hidden layer 1004 includes nodes 1044, 1046, and 1048, and the output layer 1006 includes a node 1050. In this example, each node in a layer is connected to every node in an adjacent layer via edges and an adjustable weight is often associated with each edge. For example, the node 1032 in the input layer 1002 is connected to all of the nodes 1044, 1046, and 1048 in the hidden layer 1004. Similarly, the node 1044 in the hidden layer is connected to all of the nodes 1032, 1034, 1036, 1038, 1040, and 1042 in the input layer 1002 and the node 1050 in the output layer 1006. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 1004 is an intermediate layer between the input layer 1002 and the output layer 1006 of the artificial neural network 1000. Although only one hidden layer is shown for the artificial neural network 1000 for illustrative purpose only, it has been contemplated that the artificial neural network 1000 used to implement any one of the computer-based models may include as many hidden layers as necessary. The hidden layer 1004 is configured to extract and transform the input data received from the input layer 1002 through a series of weighted computations and activation functions.

In this example, the artificial neural network 1000 receives a set of inputs and produces an output. Each node in the input layer 1002 may correspond to a distinct input. For example, when the artificial neural network 1000 is used to implement the AI model associated with the AI module 204, the nodes in the input layer 1002 may correspond to different parameters and/or attributes of a prompt (which may be generated based on the modified utterance 432 and a specification 402).

In some embodiments, each of the nodes 1044, 1046, and 1048 in the hidden layer 1004 generates a representation, which may include a mathematical computation (or algorithm) that produces a value based on the input values received from the nodes 1032, 1034, 1036, 1038, 1040, and 1042. The mathematical computation may include assigning different weights (e.g., node weights, edge weights, etc.) to each of the data values received from the nodes 1032, 1034, 1036, 1038, 1040, and 1042, performing a weighted sum of the inputs according to the weights assigned to each connection (e.g., each edge), and then applying an activation function associated with the respective node (or neuron) to the result. The nodes 1044, 1046, and 1048 may include different algorithms (e.g., different activation functions) and/or different weights assigned to the data variables from the nodes 1032, 1034, 1036, 1038, 1040, and 1042 such that each of the nodes 1044, 1046, and 1048 may produce a different value based on the same input values received from the nodes 1032, 1034, 1036, 1038, 1040, and 1042. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 702 is transformed into rather different values indicative data characteristics corresponding to a task that the artificial neural network 1000 has been designed to perform.

In some embodiments, the weights that are initially assigned to the input values for each of the nodes 1044, 1046, and 1048 may be randomly generated (e.g., using a computer randomizer). The values generated by the nodes 1044, 1046, and 1048 may be used by the node 1050 in the output layer 1006 to produce an output value (e.g., a response to a user query, a prediction, etc.) for the artificial neural network 1000. The number of nodes in the output layer depends on the nature of the task being addressed. For example, in a binary classification problem, the output layer may consist of a single node representing the probability of belonging to one class (as in the example shown in FIG. 10). In a multi-class classification problem, the output layer may have multiple nodes, each representing the probability of belonging to a specific class. When the artificial neural network 1000 is used to implement the AI model associated with the AI module 204, the output node 1050 may be configured to generate new content (e.g., a response in a natural language format, instructions for the backend modules, etc.) based on the prompt.

In some embodiments, the artificial neural network 1000 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance.

The artificial neural network 1000 may be trained by using training data based on one or more loss functions and one or more hyperparameters. By using the training data to iteratively train the artificial neural network 1000 through a feedback mechanism (e.g., comparing an output from the artificial neural network 1000 against an expected output, which is also known as the "ground-truth" or "label"), the parameters (e.g., the weights, bias parameters, coefficients in the activation functions, etc.) of the artificial neural network 1000 may be adjusted to achieve an objective according to the one or more loss functions and based on the one or more hyperparameters such that an optimal output is produced in the output layer 1006 to minimize the loss in the loss functions. Given the loss, the negative gradient of the loss function is computed with respect to each weight of each layer individually. Such negative gradient is computed one layer at a time, iteratively backward from the last layer (e.g., the output layer 1006 to the input layer 1002 of the artificial neural network 1000). These gradients quantify the sensitivity of the network's output to changes in the parameters. The chain rule of calculus is applied to efficiently calculate these gradients by propagating the gradients backward from the output layer 1006 to the input layer 1002.

Parameters of the artificial neural network 1000 are updated backwardly from the last layer to the input layer (backpropagating) based on the computed negative gradient using an optimization algorithm to minimize the loss. The backpropagation from the last layer (e.g., the output layer 1006) to the input layer 1002 may be conducted for a number of training samples in a number of iterative training epochs. In this way, parameters of the artificial neural network 1000 may be gradually updated in a direction to result in a lesser or minimized loss, indicating the artificial neural network 1000 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 11:
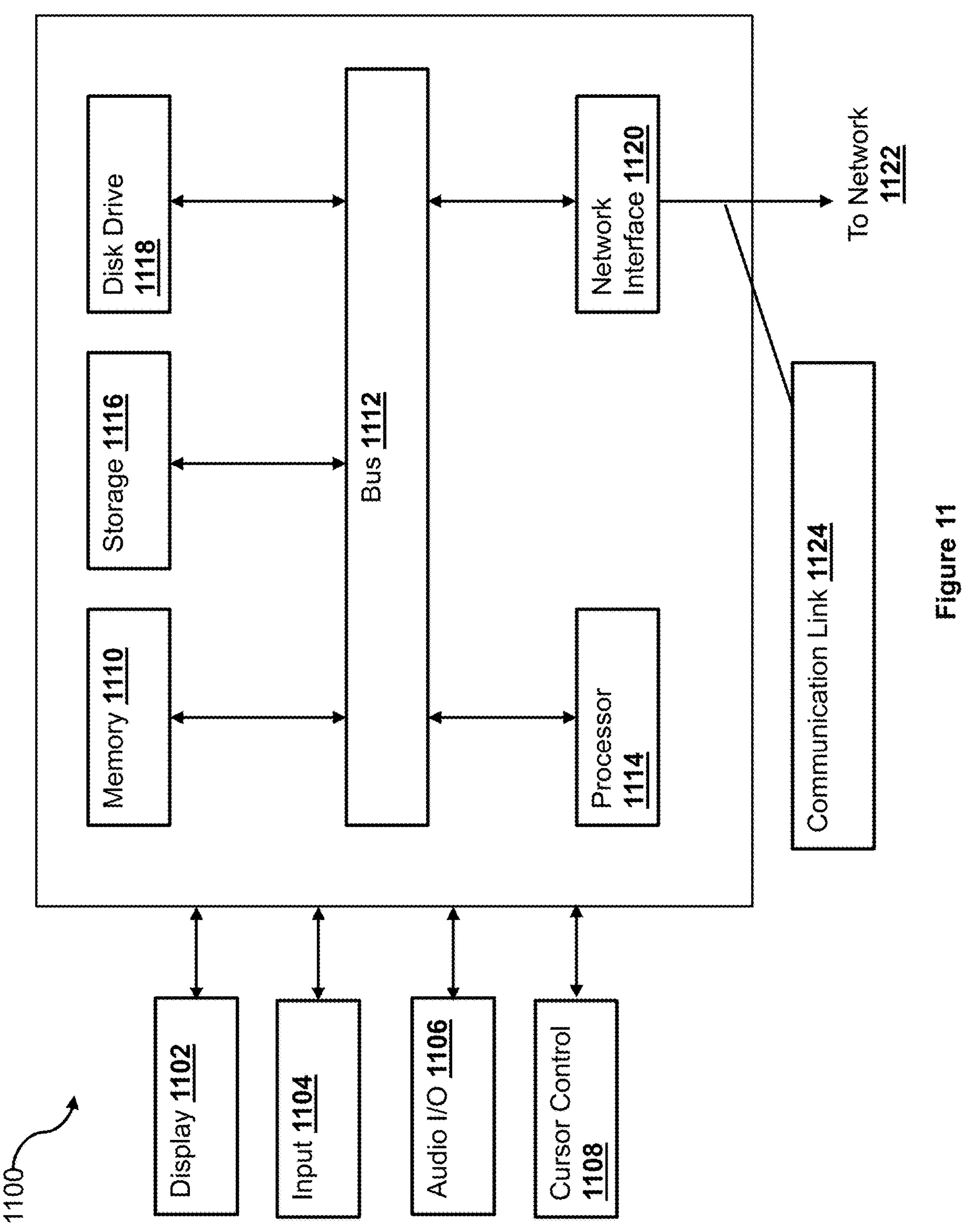
FIG. 11 is a block diagram of a system for implementing a device according to an embodiment of the present disclosure.

FIG. 11 is a block diagram of a computer system 1100 suitable for implementing one or more embodiments of the present disclosure, including the service provider server 130, the merchant server 120, the user device 180, and the user device 110. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 1100 in a manner as follows.

The computer system 1100 includes a bus 1112 or other communication mechanism for communicating information data, signals, and information between various components of the computer system 1100. The components include an input/output (I/O) component 1104 that processes a user (i.e., sender, recipient, service provider) action, such as selecting keys from a keypad/keyboard, selecting one or more buttons or links, etc., and sends a corresponding signal to the bus 1112. The I/O component 1104 may also include an output component, such as a display 1102 and a cursor control 1108 (such as a keyboard, keypad, mouse, etc.). The display 1102 may be configured to present a login page for logging into a user account or a checkout page for purchasing an item from a merchant. An optional audio input/output component 1106 may also be included to allow a user to use voice for inputting information by converting audio signals. The audio I/O component 1106 may allow the user to hear audio. A transceiver or network interface 1120 transmits and receives signals between the computer system 1100 and other devices, such as another user device, a merchant server, or a service provider server via a network 1122. In one embodiment, the transmission is wireless, although other transmission mediums and methods may also be suitable. A processor 1114, which can be a micro-controller, digital signal processor (DSP), or other processing component, processes these various signals, such as for display on the computer system 1100 or transmission to other devices via a communication link 1124. The processor 1114 may also control transmission of information, such as cookies or IP addresses, to other devices.

The components of the computer system 1100 also include a system memory component 1110 (e.g., RAM), a static storage component 1116 (e.g., ROM), and/or a disk drive 1118 (e.g., a solid-state drive, a hard drive). The computer system 1100 performs specific operations by the processor 1114 and other components by executing one or more sequences of instructions contained in the system memory component 1110. For example, the processor 1114 can perform the automated conversation functionalities described herein, for example, according to the processes 700, 800, and 900.

Logic may be encoded in a computer readable medium, which may refer to any medium that participates in providing instructions to the processor 1114 for execution. Such a medium may take many forms, including but not limited to, non-volatile media, volatile media, and transmission media. In various implementations, non-volatile media includes optical or magnetic disks, volatile media includes dynamic memory, such as the system memory component 1110, and transmission media includes coaxial cables, copper wire, and fiber optics, including wires that comprise the bus 1112. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1100. In various other embodiments of the present disclosure, a plurality of computer systems 1100 coupled by the communication link 1124 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:

a non-transitory memory; and one or more hardware processors coupled with the non-transitory memory and configured to execute instructions from the non-transitory memory to cause the system to:

receive an utterance from a device via a chat interface during a chat session;

predict, for an artificial intelligence (AI) model, an intent of a user of the device based on the utterance, wherein the AI model is communicatively coupled with a plurality of backend modules, and wherein each backend module in the plurality of backend modules is configured to perform transactions corresponding to a different transaction type;

select, from the plurality of backend modules, a particular backend module for performing a transaction for the user during the chat session based on the intent;

access, from a data storage that stores a plurality of prompt templates corresponding to the plurality of backend modules, a particular prompt template corresponding to the particular backend module;

provide the particular prompt template to the AI model, wherein the particular prompt template enables the AI model to (i) conduct a set of dialogs with the user that prompts the user for data usable by the particular backend module to perform the transaction and (ii) generate instructions for instructing the particular backend module to perform the transaction;

instruct, by the AI model and using the instructions, the particular backend module to perform the transaction for the user based on the utterance and the intent;

generate, by the AI model, content for the chat session based on a result from the particular backend module performing the transaction; and transmit the content to the device via the chat interface.

2. The system of claim 1, wherein executing the instructions further causes the system to:

generate, by the AI model, a first question that prompts the user for the data.

3. The system of claim 2, wherein executing the instructions further causes the system to:

determine that a first answer obtained from the device via the chat interface does not correspond to a set of data requirements indicated in the particular prompt template; and generate, by the AI model, a second question that prompts the user for the data.

4. The system of claim 3, wherein the second question has a different syntax than the first question.

5. The system of claim 1, wherein executing the instructions further causes the system to:

obtain, by the AI model and from the particular backend module, an output based on the performing the transaction, wherein the content is generated further based on the output.

6. The system of claim 5, wherein the output indicates whether the transaction has been completed, has been denied, or requires additional data to complete.

7. The system for claim 1, wherein executing the instructions further causes the system to:

format the utterance based on a set of policies; and provide the formatted utterance to the AI model, wherein the intent is further predicted based on the formatted first utterance.

8. A method, comprising:

receiving, via a chat interface during a chat session between a device and a computer system, a request for performing a transaction corresponding to a first transaction type;

selecting, from a plurality of modules, a first module for a user of the device based on the first transaction type;

selecting, from a plurality of templates, a first template corresponding to the first module;

providing the first template to an artificial intelligence (AI) model, wherein the first template enables the AI model to generate one or more questions that prompt the user for data usable by the first module to perform the transaction;

transmitting the one or more questions to the device via the chat interface;

generating, by the AI model, instructions for the first module to perform the transaction based on information extracted from the request and the data obtained from the user;

providing, by the AI model, the instructions to the first module;

generating, by the AI model, content for the chat session based on an output produced by the first module; and providing, by the AI model, the content to the device via the chat interface as a response to the request.

9. The method of claim 8, wherein the output comprises second data associated with the computer system obtained from a plurality of data sources, and wherein the content comprises a summary of the second data.

10. The method of claim 8, wherein the first template indicates a communication protocol for communicating with the first module, and wherein the instructions are generated further based on the first template.

11. The method of claim 8, wherein the instructions comprise an application programming interface (API) call, and wherein the method further comprises:

inserting one or more input parameters to the API call based on the extracted information.

12. The method of claim 8, wherein the content is first content, and wherein the method further comprises:

subsequent to providing the first content on the device, receiving a second request from the device via the chat interface during the chat session, wherein the second request is for performing a second transaction corresponding to a second transaction type;

selecting, from the plurality of modules, a second module for the user based on the second transaction type;

providing, by the AI model, second instructions to the second module;

generating, by the AI model, second content for the chat session based on a second output produced by the second module; and providing the second content to the user via the chat interface.

13. The method of claim 8, wherein the request comprises an utterance, and wherein the method further comprises:

processing the utterance based on a set of policies; and providing the processed utterance to the AI model, wherein the instructions are generated further based on the processed utterance.

14. The method of claim 13, wherein the processing the utterance comprises:

identifying one or more words associated with a particular word type in the utterance; and removing the one or more words from the utterance.

15. A non-transitory machine-readable medium having stored thereon machine-readable instructions executable to cause a machine to perform operations comprising:

in response to receiving a first utterance from a device via a chat interface during a chat session, determining that the first utterance corresponds to a request for performing a transaction of a particular transaction type;

selecting, from a plurality of computer modules, a particular computer module for performing the transaction based on the particular transaction type;

providing a particular prompt template corresponding to the particular computer module to an artificial intelligence (AI) model, wherein the particular prompt template enables the AI model to generate a set of questions that prompts the user for data usable by the particular computer module to perform the transaction;

transmitting the set of questions to the device via the chat interface;

generating, by the AI model, instructions that cause the particular computer module to perform the transaction for a user of the device based on the data obtained from the user;

generating, by the AI model, content for the chat session based on a result from the particular computer module performing the transaction; and transmitting the content to the device via the chat interface.

16. The non-transitory machine-readable medium of claim 15, wherein the operations further comprise:

obtaining additional information via the chat interface, wherein the particular computer module is configured to perform the transaction for the user further based on the additional information.

17. The non-transitory machine-readable medium of claim 16, wherein the operations further comprise:

generating, by the AI model, the set of questions for the user based on data types or content required by the particular computer module for performing the transaction; and obtaining the data from the user via the chat interface.

18. The non-transitory machine-readable medium of claim 17, wherein the operations further comprise:

determining the data types or content required by the particular computer module for performing the transaction based on the particular prompt template.

19. The non-transitory machine-readable medium of claim 15, wherein the operations further comprise:

detecting that a first language used in the first utterance is incompatible with the AI model; and translating the first utterance from the first language to a second language that is compatible with the AI model.

20. The non-transitory machine-readable medium of claim 15, wherein the result indicates whether the transaction has been completed, has been denied, or requires additional data to complete.

* * * * *